(12) United States Patent
Ootsuka et al.

(10) Patent No.: US 8,230,986 B2
(45) Date of Patent: *Jul. 31, 2012

(54) TORQUE LIMITER

(75) Inventors: Kazushige Ootsuka, Kashiwara (JP);
Akihide Nagayama, Kashiba (JP)

(73) Assignee: JTEKT Corporation, Osaka (JP)

( * ) Notice: Subject to any disclaimer, the term of this patent is extended or adjusted under 35 U.S.C. 154(b) by 866 days.

This patent is subject to a terminal disclaimer.

(21) Appl. No.: 12/295,400

(22) PCT Filed: Mar. 29, 2007

(86) PCT No.: PCT/JP2007/056786
§ 371 (c)(1),
(2), (4) Date: Sep. 30, 2008

(87) PCT Pub. No.: WO2007/114210
PCT Pub. Date: Oct. 11, 2007

(65) Prior Publication Data
US 2010/0184519 A1 Jul. 22, 2010

(30) Foreign Application Priority Data

Mar. 30, 2006 (JP) ................. 2006-094140
Mar. 30, 2006 (JP) ................. 2006-094160
Mar. 30, 2006 (JP) ................. 2006-094739
Mar. 30, 2006 (JP) ................. 2006-094745

(51) Int. Cl.
*F16D 7/02* (2006.01)
(52) U.S. Cl. .................................... 192/56.3
(58) Field of Classification Search ............. 192/56.3, 192/75, 79, 85.12, 85.13, 85.61, 107 M, 107 T, 192/113.36; 188/367; 403/31
See application file for complete search history.

(56) References Cited

U.S. PATENT DOCUMENTS

| 4,264,229 A | | 4/1981 | Falk et al. | |
| 4,303,150 A | * | 12/1981 | Olsson | 192/85.12 |
| 4,752,275 A | * | 6/1988 | Lindenthal et al. | |
| 4,759,428 A | * | 7/1988 | Seshimo | |
| 4,944,377 A | * | 7/1990 | Elsner | 192/56.3 |
| 5,051,018 A | * | 9/1991 | Appell et al. | |
| 5,551,852 A | * | 9/1996 | Saito et al. | |
| 6,148,981 A | * | 11/2000 | Lindenthal | 192/56.3 |
| 6,343,682 B1 | * | 2/2002 | Terada et al. | |

(Continued)

FOREIGN PATENT DOCUMENTS

DE 10311367 * 10/2003

(Continued)

OTHER PUBLICATIONS

International Search Report for International Application No. PCT/JP2007/056786, mailed Jul. 3, 2007.

(Continued)

*Primary Examiner* — Gregory Binda
*Assistant Examiner* — Josh Skroupa
(74) *Attorney, Agent, or Firm* — Nixon & Vanderhye P.C.

(57) ABSTRACT

A torque limiter includes a shaft member 1, a cylinder member 2, and a traction oil. The shaft member 1 has an outer circumferential surface 20, and the cylinder member 2 has an inner circumferential surface 21 which is to be frictionally coupled to the outer circumferential surface 20 of the shaft member 1 during torque transmission. The traction oil is interposed between the outer circumferential surface 20 of the shaft member 1 and the inner circumferential surface 21 of the cylinder member 2.

15 Claims, 7 Drawing Sheets

U.S. PATENT DOCUMENTS

| | | |
|---|---|---|
| 6,761,256 B2 * | 7/2004 | Falk .................... 192/56.3 |
| 7,025,185 B2 * | 4/2006 | Nagayama et al. ......... 192/56.3 |
| 2003/0132088 A1 * | 7/2003 | Watanabe et al. |
| 2004/0134738 A1 | 7/2004 | Nagayama et al. |
| 2005/0067207 A1 * | 3/2005 | Radtke et al. |
| 2006/0051003 A1 * | 3/2006 | Nii et al. |
| 2008/0058155 A1 * | 3/2008 | Sinojima |

FOREIGN PATENT DOCUMENTS

| | | |
|---|---|---|
| EP | 1602743 * | 12/2005 |
| GB | 1557487 | 12/1979 |
| JP | 53-102450 | 9/1978 |
| JP | 62-119532 | 7/1987 |
| JP | 63-30527 | 6/1988 |
| JP | 4-73437 | 3/1992 |
| JP | 6-49828 | 7/1994 |
| JP | 6-323336 | 11/1994 |
| JP | 2002-303359 | 10/2002 |
| JP | 2003-193776 | 7/2003 |
| JP | 2003-278788 | 10/2003 |
| JP | 2004-211794 A | 7/2004 |
| JP | 2007255604 A * | 10/2007 |
| WO | 01-31219 | 5/2001 |

OTHER PUBLICATIONS

International Preliminary Report on Patentability mailed Oct. 30, 2008 in corresponding PCT Application No. PCT/JP2007/056786.

* cited by examiner

TORQUE LIMITER

This application is the U.S. national phase of International Application No. PCT/JP2007/056786, filed 29 Mar. 2007, which designated the U.S. and claims priority to Japan Application No. 2006-094739, filed 30 Mar. 2006; Japan Application No. 2006-094140, filed 30 Mar. 2006, Japan Application No. 2006-094160, filed 30 Mar. 2006; and Japan Application No. 2006-094745, filed 30 Mar. 2006, the entire contents of each of which are hereby incorporated by reference.

TECHNICAL FIELD

The present technology relates to a torque limiter.

BACKGROUND ART

Conventionally, a torque limiter, which is described in the publication of JP 63-30527 B or the like, plays the role of preventing, e.g. in steel rolling mills or the like, such expensive machines (parts) as universal joints (UJ) from malfunctioning due to overloads applied thereto. The torque limiter, while burdened with a load within a specified range for transmitting torque to a shaft member or a cylinder member, contracts the diameter of the inner circumferential surface of the cylinder member by a hydraulic passage that has expanded by feed of oil for use of oil pressure expansion so that the outer circumferential surface of a shaft member internally fitted to the inner circumferential surface of the cylinder member is tightened by the inner circumferential surface of the cylinder member, thus making the shaft member and the cylinder member frictionally coupled to each other to fulfill torque transmission.

Also, when a load over a specified value is applied to the shaft member or the cylinder member so that the inner circumferential surface of the cylinder member is rotated relative to the outer circumferential surface of the shaft member with the result that the shaft member is changed in its circumferential position relative to the cylinder member, the oil for oil pressure expansion is bled out from within the hydraulic passage of the cylinder member to release the inner circumferential surface of the cylinder member from pressing against the outer circumferential surface of the shaft member, thereby undoing the frictional coupling between the shaft member and the cylinder member to cut off the torque transmission. The design release torque (a torque at which a torque limiter starts idling) of the torque limiter is set between a fatigue strength (a strength which, even if a torque of the same magnitude is applied to a machine such a large number of times as $10^7$ or so, does not cause break of the machine) of a machine that is to be prevented from breakage by the torque limiter being connected thereto, and a static strength (a strength which, even if a torque of the same magnitude is applied to a machine only once, causes the machine to break) of the machine. In this way, the torque limiter enhances the torque to be transmitted in magnitude, and moreover, with a load of a specified value or more applied to the shaft member or the cylinder member, protects expensive machines connected to the torque limiter or prevents personal injuries.

In recent years, from demands for lessened placement space and the like, there has been a tendency toward smaller sizes of the machines (e.g., universal joints), which involves a tendency toward lowered static strengths of those machines.

FIG. 7 is a chart for explaining a problem occurring due to a decrease in the static strength of the machine. It is noted that in FIG. 7, a universal joint (UJ) is used as an example of the machine.

As shown in FIG. 7, when the UJ is reduced in diameter (reduced in size) with the static strength of the UJ decreased, a difference denoted by 'a' in FIG. 7 between the static strength and a set value of the release torque decreases down to a difference denoted by 'b' in FIG. 7. In this case, if the value of the release torque is subjected to a large variation and this variation is larger than 'b', then there is a possibility that the UJ may break. Therefore, the demand for a torque limiter having smaller variations of the release torque has been increasing.

Patent Document: JP 63-30527 B

SUMMARY OF THE TECHNOLOGY

Accordingly, an object of the present technology is to provide a torque limiter having smaller variations of the release torque.

In order to achieve the above object, the technology provides a torque limiter comprising:

a shaft member; and a cylinder member rotatably externally fitted to the shaft member, wherein one member of the cylinder member and the shaft member has, in its inside, a hydraulic passage for pressing a circumferential surface of the one member against a circumferential surface of the other member of the cylinder member and the shaft member, and a traction oil is interposed between the circumferential surface of the cylinder member and the circumferential surface of the shaft member.

The present inventors, as will be described in detail below, have found out empirically that variations in release torque can be reduced to a great extent in comparison to conventional ones when not turbine oil of conventional use but so-called traction oil to be used for CVT (continuously variable transmission) or the like is used as the lubricating oil interposed between the circumferential surface of the shaft member and the circumferential surface of the cylinder member that is to be frictionally coupled to the circumferential surface of the shaft member during power transmission.

Since the traction oil is interposed between the circumferential surface of the cylinder member and the circumferential surface of the shaft member, variations in release torque can be reduced to a great extent in comparison to conventional ones. Thus, even with a small static strength of a machine connected to the torque limiter, the machine can reliably be prevented from breakage.

In one embodiment, at least one circumferential surface out of the circumferential surface of the cylinder member and the circumferential surface of the shaft member has an oil-seal preventing groove opened on axial both sides of the shaft member.

In this embodiment, variations in release torque can be further reduced. More specifically, in this embodiment, since at least one circumferential surface out of the circumferential surface of the cylinder member and the circumferential surface of the shaft member has an oil-seal preventing groove opened on axial both sides of the shaft member, excess (more than necessary) seizure-preventing traction oil present between the shaft member and the cylinder member, during normal torque transmission with no excessive load applied to the shaft member or the cylinder member, can be discharged outside via the opening of the oil-seal preventing groove by the surface pressure which is generated by the oil-pressure expansion oil sealed in the hydraulic passage and with which the circumferential surface of the one member is pressed against the circumferential surface of the other member.

Accordingly, the seizure-preventing traction oil present between the shaft member and the cylinder member does not weaken the force with which the cylinder member clamps the shaft member to an extent more than a specified value (design value). Thus, the release torque can be prevented from lowering to much lower than a specified value (design value), so that the release torque can be maintained generally at a design value.

Also in this embodiment, while excess (more than necessary) seizure-preventing traction oil present between the shaft member and the cylinder member can be discharged outside via the opening of the oil-seal preventing groove, a necessary amount of the seizure-preventing traction oil can be made present between the shaft member and the cylinder member. Accordingly, occurrence of seizure in the shaft member and the cylinder member can reliably be prevented even when the shaft member is rotated relative to the cylinder member due to an overload applied to the torque limiter.

In one embodiment, the oil-seal preventing groove is spiral-shaped.

In this embodiment, the oil-seal preventing groove is spiral-shaped, and therefore easy to machine. Further, even if any excess traction oil is present at any portion in the circumferential direction, the excess traction oil can be discharged outside smoothly.

In one embodiment, in a cross section perpendicular to an extending direction of the oil-seal preventing groove, a line drawn by at least one of the circumferential surface of the cylinder member and the circumferential surface of the shaft member on which the oil-seal preventing groove is formed is smooth at least at both end portions of the oil-seal preventing groove.

It is noted that the extending direction of the groove refers to an extending direction of a curved line which is a locus drawn by the deepest site in the groove.

In this embodiment, since the line drawn by the at least one circumferential surface out of the circumferential surface of the cylinder member and the circumferential surface of the shaft member, in which the oil-seal preventing groove is formed, in a cross section perpendicular to the extending direction of the oil-seal preventing groove is smooth at at least both end portions of the oil-seal preventing groove, torque transmission can be fulfilled even by the seizure-preventing traction oil that has entered between both end portions of the groove and portions of the circumferential surface of the shaft member or the circumferential surface of the cylinder member which are opposed by the groove and which range inward along both ends of the groove, during the torque transmission. Accordingly, variations in release torque can be further suppressed.

Also in this embodiment, since the line drawn by the at least one circumferential surface out of the circumferential surface of the cylinder member and the circumferential surface of the shaft member, in which the groove is formed, in the cross section is smooth at at least both end portions of the oil-seal preventing groove, there never occurs damage (scuffing) or seizure at both end portions of the groove and the circumferential surface of the shaft member or the circumferential surface of the cylinder member opposed by the groove even with very high surface pressures applied to the circumferential surface of the shaft member and the circumferential surface of the cylinder member during torque transmission.

In one embodiment, in the cross section, the line drawn by the at least one of the circumferential surface of the cylinder member and the circumferential surface of the shaft member on which the oil-seal preventing groove is formed is a curved line which is smooth over an entire profile of the oil-seal preventing groove.

In this embodiment, since the line drawn by the groove in the cross section is a curved line which is smooth over the entire profile of the groove, the groove can be made free from any bend and large in strength unlike common triangular-shaped-in-cross-section grooves which are used in various fields, for example. Accordingly, vicinities of the bottom portion of the groove are almost free from damage, so that the torque limiter can be prolonged in service life. Also, while the depth of the groove is set shallow, the groove can be increased in width, in comparison to common triangular-shaped-in-cross-section grooves. Therefore, the effect of discharging the seizure-preventing traction oil outside can be enhanced and, at the same time, diffusibility of the traction oil can be improved without increasing the number of turns of the spiral-shaped groove. Thus, the lubricity can be improved.

In one embodiment, mutually sliding contact portions of the circumferential surface of the cylinder member and the circumferential surface of the shaft member respectively have a nitride layer and substantially equal hardness.

In this embodiment, since mutually sliding contact portions of the circumferential surface of the cylinder member and the circumferential surface of the shaft member have a nitride layer, and have generally equal hardness, the mutually sliding contact portions of the circumferential surface of the cylinder member and the circumferential surface of the shaft member can be improved in durability. Besides, since the mutually sliding contact portions of the circumferential surface of the cylinder member and the circumferential surface of the shaft member include a nitride layer, the mutually sliding contact portions can be increased in hardness, so that the shaft member and the cylinder member can be improved in durability. Moreover, since the mutually sliding contact portions of the circumferential surface of the cylinder member and the circumferential surface of the shaft member include a nitride layer, the mutually sliding contact portions are less prone to wear, and any newly emerging surface is less likely to appear. Therefore, the transmittable torque can be made larger and the release torque can be made closer to a designed release torque.

In one embodiment, the nitride layer is present on a surface of the oil-seal preventing groove, and the circumferential surface of the cylinder member and the circumferential surface of the shaft member have substantially equal hardness.

In this embodiment, since the nitride layer is present on the surface of the oil-seal preventing groove, the torsional strength of the groove can be made larger, making it possible to increase the component of the torque transmitted by the intervention of traction oil that has entered between the groove and portions of the circumferential surface of the shaft member or the circumferential surface of the cylinder member which are opposed by the groove and which range inward along edge portions of the groove. Accordingly, the transmittable torque can be further increased, and the release torque can be made further closer to the designed release torque.

In one embodiment, the circumferential surface of the cylinder member and the circumferential surface of the shaft member have a Vickers hardness of 600 or higher, and the nitride layers have a layer thickness of 2 μm to 3 μm.

In this embodiment, the shaft member and the cylinder member can be further improved in their durability, so that the service life of the torque limiter can be further prolonged.

According to the torque limiter, since the traction oil is interposed between the circumferential surface of the shaft member and the circumferential surface of the cylinder member, variations in release torque can be reduced to a great extent in comparison to conventional ones. Thus, even with a small static strength of a machine connected to the torque limiter, the machine can reliably be prevented from breakage.

According to the torque limiter of one embodiment, since at least one circumferential surface out of the circumferential surface of the cylinder member and the circumferential surface of the shaft member has an oil-seal preventing groove opened on axial both sides of the shaft member, excess seizure-preventing traction oil present between the shaft member and the cylinder member, during normal torque transmission, can be discharged outside via the opening of the oil-seal preventing groove by the surface pressure with which the circumferential surface of the one member is pressed against the circumferential surface of the other member. Accordingly, the seizure-preventing traction oil is never excessively retained or sealed between the shaft member and the cylinder member and, as a result, does not weaken the force with which the cylinder member clamps the shaft member to an extent more than a specified value. Thus, the release torque can be prevented from lowering to much lower than a specified value, so that the release torque can be maintained generally at a design value. Hence, the torque transmission can be fulfilled with high reliability.

Also, according to the torque limiter of one embodiment, while excess (more than necessary) seizure-preventing traction oil present between the shaft member and the cylinder member can be discharged outside via the opening of the oil-seal preventing groove, a necessary amount of the seizure-preventing traction oil can be made present between the shaft member and the cylinder member. Accordingly, occurrence of seizure in the shaft member and the cylinder member can reliably be prevented even when the shaft member is rotated relative to the cylinder member due to an overload applied to the torque limiter.

Also, according to the torque limiter of one embodiment, the oil-seal preventing groove is spiral-shaped, and therefore easy to machine. Further, even if any excess traction oil is present at any portion in the circumferential direction, the excess traction oil can be discharged outside smoothly.

Also, according to the torque limiter of one embodiment, since a line drawn by at least one circumferential surface out of the circumferential surface of the cylinder member and the circumferential surface of the shaft member, in which the oil-seal preventing groove is formed, in a cross section perpendicular to the extending direction of the groove is smooth at at least both end portions of the oil-seal preventing groove, torque transmission can be fulfilled even by the seizure-preventing traction oil that has entered between both end portions of the groove and portions of the circumferential surface of the shaft member or the circumferential surface of the cylinder member which are opposed by the groove and which range inward along both ends of the groove, during the torque transmission. Accordingly, variations in release torque can be further suppressed.

Also, according to the torque limiter of one embodiment, since a line drawn by at least one circumferential surface out of the circumferential surface of the cylinder member and the circumferential surface of the shaft member, in which the groove is formed, in a cross section perpendicular to the extending direction of the groove is smooth at at least both end portions of the oil-seal preventing groove, there never occurs damage (scuffing) or seizure at both end portions of the groove and in the circumferential surface of the shaft member or the circumferential surface of the cylinder member opposed by the groove even with very high surface pressures applied to the circumferential surface of the shaft member and the circumferential surface of the cylinder member during torque transmission.

Also, according to the torque limiter of one embodiment, since mutually sliding contact portions of the circumferential surface of the cylinder member and the circumferential surface of the shaft member have a nitride layer, and have generally equal hardness, the mutually sliding contact portions of the circumferential surface of the cylinder member and the circumferential surface of the shaft member can be improved in durability. Besides, since the mutually sliding contact portions of the circumferential surface of the cylinder member and the circumferential surface of the shaft member include a nitride layer, the mutually sliding contact portions can be increased in hardness, so that the shaft member and the cylinder member can be improved in durability. Moreover, since the mutually sliding contact portions of the circumferential surface of the cylinder member and the circumferential surface of the shaft member include a nitride layer, the mutually sliding contact portions are less prone to wear, and any newly emerging surface is less likely to appear. Therefore, the transmittable torque can be made larger and the release torque can be made closer to a designed release torque.

BRIEF DESCRIPTION OF THE DRAWINGS

The technology will become more fully understood from the detailed description given hereinbelow and the accompanying drawings which are given by way of illustration only, and thus are not limitative of the technology, and wherein.

DETAILED DESCRIPTION OF THE TECHNOLOGY

Hereinbelow, the technology will be described in detail by way of embodiments thereof illustrated in the accompanying drawings.

Figure 1:
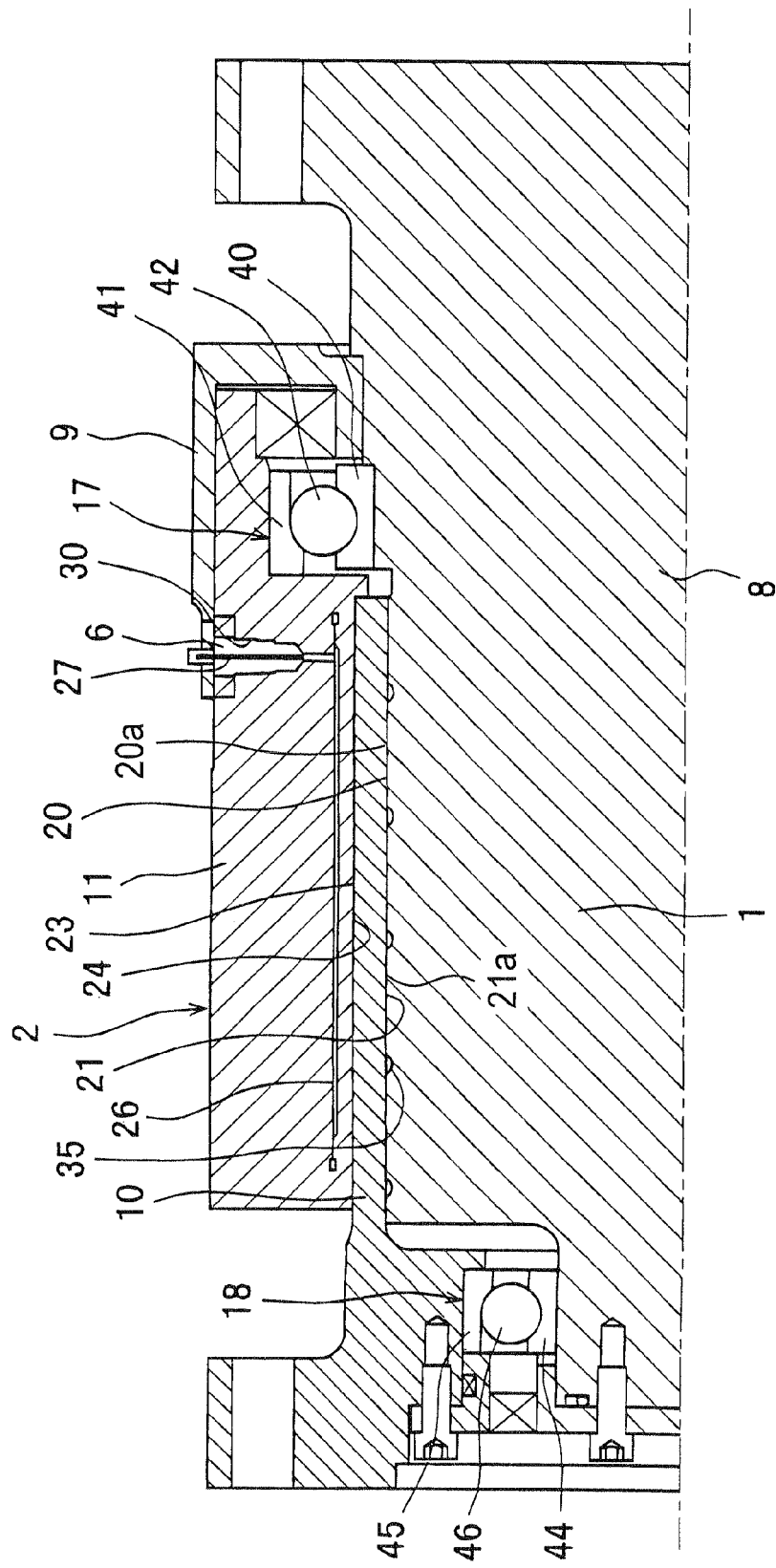
FIG. 1 is an axial sectional view of a torque limiter according to a first embodiment.

FIG. 1 is an axial sectional view of a torque limiter according to a first embodiment.

This torque limiter has a shaft member 1, a cylinder member 2, a shear valve 6, a ball bearing 17 and a ball bearing 18.

The shaft member 1 has a body portion 8 having a generally cylindrical-shaped outer circumferential surface 20 as its circumferential surface, and a generally L-shaped-in-cross-section engagement portion 9 protruding from the outer surface of the body portion 8. The outer circumferential surface 20 of the shaft member 1 has one spiral-shaped groove 35 for oil seal prevention. The spiral-shaped groove 35 is opened on both axial sides of a frictional-coupling portion of the shaft member 1 to be coupled on the cylinder member 2. The pitch of the spiral-shaped groove 35 is not less than 1/10 and not more than 1/5 of the shaft diameter (outer diameter) of the shaft member 1.

The cylinder member 2 is made up of a first cylinder member 10 and a second cylinder member 11. The first cylinder member 10 has a generally cylindrical-shaped inner circumferential surface 21 as its circumferential surface. The inner circumferential surface 21 is to be frictionally coupled to the outer circumferential surface 20 of the shaft member 1 in transmission of motive power. The outer circumferential surface (including the surface of the groove 35) 20 of the shaft member 1, which is the torque transmission surface, and the inner circumferential surface 21 of the cylinder member 2 have been cured by being subjected to low-temperature nitriding treatment with a treatment temperature ranging from 400° C. to 420° C., so that a top layer portion including the outer circumferential surface 20 of the shaft member 1 (including the surface of the groove 35) has been formed into a nitride layer 20a while a top layer portion including the inner circumferential surface 21 of the cylinder member 2 has been formed into a nitride layer 21a. Layer thicknesses of these two nitride layers 20a, 21a are both within, a range from 2 μm to 3 μm, hardnesses of the two nitride layers are roughly equal to each other, Vickers hardnesses Hv of the two nitride layers 20a, 21a being both not less than 600 Hv.

Traction oil, which is lubricating oil for use of seizure prevention, is filled between the outer circumferential surface 20 of the shaft member 1 and the inner circumferential surface 21 of the cylinder member 2. This traction oil is exemplified by naphthenic synthetic oils or naphthenic mineral oils having: alicyclic-family functional groups such as cyclopentyl groups, cyclohexyl groups, cycloheptyl groups or others, or alicyclic-family functional groups part of which are formed into an unsaturated bond; functional groups resulting from replacing partial carbon atoms of those functional groups with oxygen atoms, sulfur atoms or nitrogen atoms, as well as functional groups resulting from cross-linking of those functional groups, functional groups having condensed rings obtained by condensation of those functional groups, or polycyclic aromatic functional groups formed by using these functional groups shown above. Other examples of the traction oil include, for example, branched alkylbenzene or alkylnaphthalene, or polyorganosiloxane containing phenyl groups or cyclohexyl groups. Further example of the traction oil include hydrogenerated compound of α-alkylstyrene dimers or α-alkylstyrene dimers, for example, and perfluoropolyether represented by a structural formula of F—(CF(CF$_3$)CF$_2$O)$_n$—C$_2$F$_5$ and derivatives of this perfluoropolyether.

The traction oils shown above may be mixed with known lubricating oils such as paraffinic mineral oils, hydrocarbon synthetic oils such as poly-α-olefinic oils, ester oils including diesters, polyol esters and so on, polyalkylglycol oil, alkyldiphenylether oil, silicone oil, and perfluoroalkylpolyether oil.

With the aim of further improving the practicality, such additives may be added in proper amounts to the traction oils, as antioxidants, rust-preventive agents, detergent dispersants, pour point depressants, viscosity index improvers, high-pressure agents, antiwear additives, corrosion inhibitors, antifoaming agents, metal deactivators, and colorants.

Then, out of these traction oils, those having larger pressure viscosity indices are preferred. For the use in this case, the traction oil has a pressure viscosity index of preferably 18 GPa$^{-1}$ (40° C.) or more, more preferably 25 GPa$^{-1}$ (40° C.) or more, even more preferably 32 GPa$^{-1}$ (40° C.) or more. Such traction oils are easily vitrifiable by the contact pressure between shaft and sleeve, highly transmittable for driving force, reduced in direct contact between shaft and sleeve to prevent locking of the shaft and the sleeve, and can easily fulfill torque release when the traction oil is liquefied with oil pressure in the hydraulic chamber lowered.

The second cylinder member 11 has a generally cylindrical-shaped inner circumferential surface 24 to make contact with a generally cylindrical-shaped outer circumferential surface 23 of the first cylinder member 10. The second cylinder member 11 also has a shear valve mounting hole 30, and an annular hydraulic passage 26 extending generally along an axial direction of the shaft member 1 over a generally entire axial length of the inner circumferential surface 24 of the second cylinder member 11.

The shear valve 6 is fitted into the shear valve mounting hole 30. With the shear valve 6 fitted into the shear valve mounting hole 30, one end portion of the shear valve 6 projects radially outward more than the outer circumferential surface of the second cylinder member 11. Also, the generally L-shaped-in-cross-section engagement portion 9 has a radially extending portion extending generally along the radial direction and axially opposed to an end face of the second cylinder member 11, and an axially extending portion connecting to the radially extending portion and axially extending along the outer circumferential surface of the second cylinder member 11. The one end portion of the shear valve 6 is engaged by the axially extending portion of the engagement portion 9.

The shear valve 6 also has a tube 27 opened only at one end thereof. The tube 27 extends generally along the radial direction of the shaft member 1 in the state that the shear valve 6 is fitted into the shear valve mounting hole 30. Also in the state that the shear valve 6 is fitted into the shear valve mounting hole 30, one end portion of the tube 27 on its closed side projects radially outward more than the outer circumferential surface of the second cylinder member 11. An opening of the tube 27 on its one side opposite to the closed side communicates with one end of the hydraulic passage 26. As a result of this, a space on one side of the hydraulic passage 26 on which the shear valve 6 is provided is a sealed space.

The ball bearing 17 has an inner ring 40 externally fitted and fixed to the outer surface of the shaft member 1, an outer ring 41 internally fitted and fixed to the inner surface of the second cylinder member 11, and balls 42 placed between a raceway surface of the inner ring 40 and a raceway surface of the outer ring 41. The ball bearing 18 has an inner ring 44 externally fitted and fixed to the outer surface of the shaft member 1, an outer ring 45 internally fitted and fixed to the inner surface of the first cylinder member 10, and balls 46 placed between a raceway surface of the inner ring 44 and a raceway surface of the outer ring 45. The ball bearings 17 and 18 support the shaft member 1 so as to allow the shaft member 1 to rotate relative to the cylinder member 2 while the shaft member 1 is rotating relative to the cylinder member 2.

Figure 2:
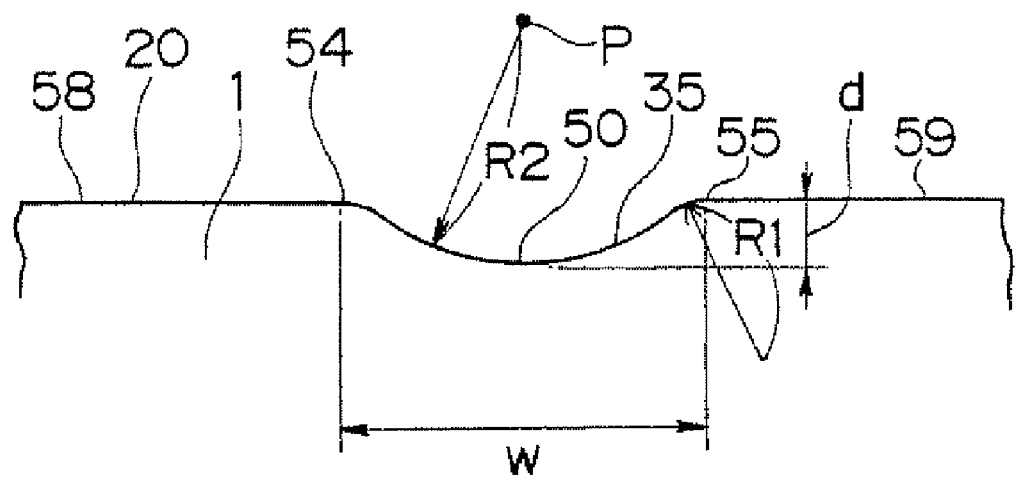
FIG. 2 is a sectional view perpendicular to a direction in which a groove for use of oil seal prevention extends.

FIG. 2 is a sectional view perpendicular to a direction in which the spiral-shaped groove 35 extends (a sectional view perpendicular to a locus drawn by a bottom 50 of the groove 35).

As shown in FIG. 2, in the cross section perpendicular to the extending direction of the groove 35, a line drawn by the groove 35 is smoothly curved at both end portions of the groove 35. In the cross section perpendicular to the extending direction of the groove 35, as shown in FIG. 2, both end portions (edges) of the groove are chamfered (R-finished) so as to have an R shape (curved surface shape) having a radius $R_1$ of curvature ranging from 1.8 mm to 2.2 mm. Also, both end portions of the groove 35 are set to a roughness Ra of 1.4 to 1.8.

Also, in the cross section perpendicular to the extending direction of the groove 35, one end portion of the groove 35 smoothly connects to a portion 58 of the outer circumferential surface 20 of the shaft member 1, on which the groove 35 is formed, the portion 58 being part of the outer circumferential surface 20 on the one-end-portion side of the groove 35. In the cross section, the line drawn by the outer circumferential surface 20 of the shaft member 1 is differentiable over the entire region of one end portion of the groove 35 including its one end 54. Similarly, in the cross section, the other end portion of the groove 35 smoothly connects to a portion 59 of the outer circumferential surface 20 of the shaft member 1, on which the groove 35 is formed, the portion 59 being part of the outer circumferential surface 20 on the other-end-portion side of the groove 35. In the cross section, the line drawn by the outer circumferential surface 20 of the shaft member 1 is differentiable over the entire region of the other end portion of the groove 35 including the other end 55.

Referring also to the cross section of FIG. 2, the profile of the groove 35 has a circular-arc shape whose center point P is away from the axis of the outer circumferential surface 20 radially farther than portions of the outer circumferential surface 20 except the surface of the groove 35. In the cross section, the line drawn by the groove 35 is a smoothly curved line over the entire profile of the groove 35, and the line drawn by the groove 35 in the cross section of FIG. 2 is a curved line which is concave toward the depthwise direction of the groove 35 and which is differentiable over the entire profile of the groove 35. A radius $R_2$ of curvature of the profile of the circular-arc shaped groove 35 is set to 2 mm to 6 mm. Further, a width w of the groove 35 is set to a length which is 1 time to 2.6 times as long as the radius $R_2$ of curvature of the circular-arc-shaped profile of the groove 35, while a depth d of the groove 35 is set to 0.5 mm to 1.5 mm.

With this construction, in a case where the shaft member 1 or the cylinder member 2 is burdened with a load of a specified value or lower (a load within a range over which torque transmission is fulfilled), the inner circumferential surface 21 of the first cylinder member 10 is reduced in diameter by the oil-pressure expansion use oil injected into the hydraulic passage 26 via an unshown coupler and thereafter sealed so that the inner circumferential surface 21 is pressed against the outer circumferential surface 20 of the shaft member 1, by which the shaft member 1 and the cylinder member 2 are frictionally coupled to each other, allowing torque transmission to be fulfilled between the shaft member 1 and the cylinder member 2.

Meanwhile, in another case where the shaft member 1 or the cylinder member 2 is burdened with a load of a specified value or higher (a load beyond the range over which torque transmission is fulfilled) so that the outer circumferential surface 20 of the shaft member 1 slips against the inner circumferential surface of the first cylinder member 10 with the result that the shaft member 1 and the cylinder member 2 relatively rotate, the engagement portion 9 cuts off the one end portion of the shear valve 6 so that the oil-pressure expansion use oil within the hydraulic passage 26 is discharged outside via the shear valve 6, one end portion of which has been cut off. In this way, the force with which the inner circumferential surface of the first cylinder member 10 presses the outer circumferential surface 20 of the shaft member 1 is eliminated, by which the frictional coupling between the shaft member 1 and the cylinder member 2 is released to cut off the torque transmission. Thus, upon occurrence of an overload on the shaft member 1 or the cylinder member 2, torque transmission is cut off so that expensive machines coupled to the torque limiter device are protected or personal injuries are prevented.

The present inventors have found out that in conventional torque limiters, the lubricating oil for prevention of seizure of the shaft member and the cylinder member exerts a fluid-lubrication like action to weaken the force with which the cylinder member clamps the shaft member, so that a torque smaller than a predetermined release torque causes the cylinder member to rotate relative to the shaft member, making it impossible to fulfill the torque transmission, as is the case that frequently occurs. Also, the present inventors have found out that if an oil-seal preventing groove opened on axial both sides of the shaft member is formed in at least one of the outer circumferential surface of the shaft member and the inner circumferential surface of the cylinder member, excess lubricating oil for seizure prevention can be bled off outside via the opening of the oil-seal preventing groove, so that unexpected occurrence of excess residence and seal of the lubricating oil between the shaft member and the cylinder member can be prevented, making it possible to achieve a desired contact state and keeping the value of the release torque from going much lower than a desired value (design value).

Figure 3:
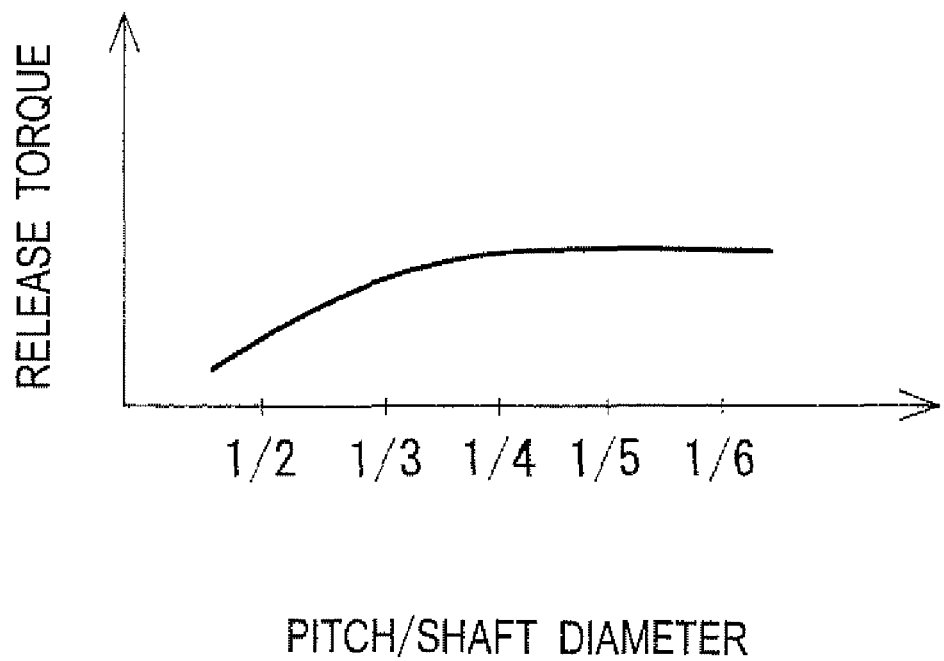
FIG. 3 shows one experimental example of a relationship between the release torque and a value obtained by dividing the pitch of a spiral-shaped oil-seal preventing groove opened at its both ends by the shaft diameter (outer diameter) of a shaft member.

FIG. 3 shows one experimental example of a relationship between the release torque and a value obtained by dividing the pitch of the spiral-shaped oil-seal preventing groove opened at its both ends by the shaft diameter (outer diameter) of the shaft member.

As shown in FIG. 3, in a region in which the value of pitch/shaft diameter (pitch over shaft diameter) is ¼ or more, the release torque monotonously increases with decreasing value of pitch/shaft diameter. Also, in a region in which the value of pitch/shaft diameter is ⅕ or less, the release torque keeps generally constant value (which is a desired (design) value of release torque). As can be seen from this, forming the spiral-shaped oil-seal preventing groove opened at its both ends allows the release torque to become closer to a desired release torque, than in torque limiters in which a groove opened at its both ends is not provided in the torque transmission surface. Further, setting the value of pitch/shaft diameter to ⅕ or less allows the actual release torque to become an approximately desired value (design value). Also, the value of pitch/shaft diameter is preferably set to 1/10 or more. If the value of pitch/shaft diameter is less than 1/10, the contact area between the outer circumferential surface of the shaft member 1 and the inner circumferential surface of the first cylinder member 10 decreases, causing the surface pressure of the contact portion to increase, which may cause scuffing of the groove portion.

Further, the present inventors investigated variations in release torque of a torque limiter in which turbine oil of conventional use was used as the lubricating oil for prevention of seizure of the outer circumferential surface of the shaft member and the inner circumferential surface of the cylinder member, as well as variations in release torque of a torque limiter in which traction oil was used as the lubricating oil for prevention of seizure of the outer circumferential surface of the shaft member and the inner circumferential surface of the cylinder member. This investigation was performed under the condition that constituent elements of the torque limiters were of the same in all except the lubricating oil for prevention of seizure of the outer circumferential surface of the shaft member and the inner circumferential surface of the cylinder member. Also, the investigation was done at different plural temperatures, and further done with a plurality of torque limiters with changed surface roughnesses of the outer circumferential surface of the shaft member and the inner circumferential surface of the cylinder member, which are the torque transmission surfaces.

Figure 4:
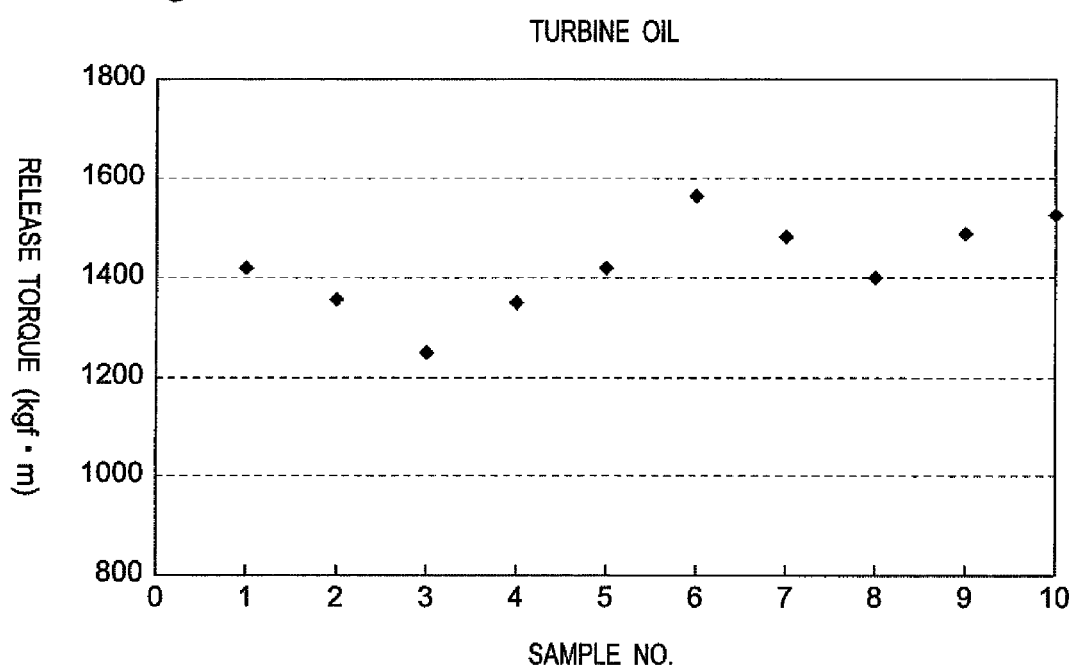
FIG. 4 is a chart showing variations in release torque of a torque limiter of one experimental example in a case where turbine oil of conventional use was used as lubricating oil for use of prevention of seizure of the outer circumferential surface of a shaft member and the inner circumferential surface of a cylinder member.
Figure 5:
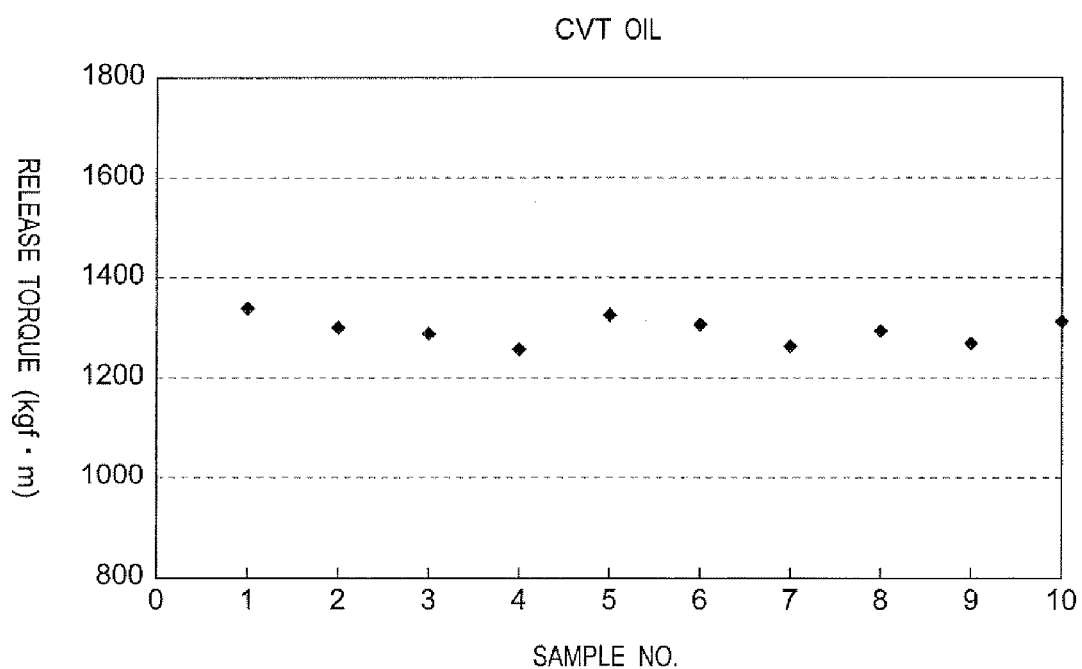
FIG. 5 is a chart showing variations in release torque of a torque limiter of one experimental example in a case where traction oil was used as lubricating oil for use of prevention of seizure of the outer circumferential surface of the shaft member and the inner circumferential surface of the cylinder member.

FIG. 4 is a chart showing variations in release torque of a torque limiter of one experimental example in a case where turbine oil of conventional use was used as the lubricating oil for use of prevention of seizure of the outer circumferential surface of the shaft member and the inner circumferential surface of the cylinder member. Also, FIG. 5 is a chart showing variations in release torque of a torque limiter of one experimental example in a case where traction oil (in this case, CVT oil for use in CVT (continuously variable transmission) as an example) was used as the lubricating oil for use of prevention of seizure of the outer circumferential surface of the shaft member and the inner circumferential surface of the cylinder member. Experiment results showed, in all cases, such tendencies as shown in FIGS. 4 and 5 regardless of temperature and surface roughnesses of the outer circumferential surface of the shaft member and the inner circumferential surface of the cylinder member, which are torque transmission surfaces.

As shown in FIG. 4, with turbine oil used as the lubricating oil for seizure prevention, a maximum width of variations in release torque is a level of about 300 (kgf·m) from an experimental result of the torque limiter of Sample No. 3 and an experimental result of the torque limiter of Sample No. 6. Meanwhile, with CVT oil used as the lubricating oil for seizure prevention as shown in FIG. 5, a maximum width of variations in release torque is 100 (kgf·m) or less.

As apparent from this, variations in release torque can be reduced to a great extent in comparison to conventional ones when not turbine oil of conventional use but so-called traction oil to be used for CVT (continuously variable transmission) or the like is used as the seizure-prevention use lubricating oil interposed between the outer circumferential surface of the shaft member and the inner circumferential surface of the cylinder member. Even if a static strength (a strength which, even if a torque of the same magnitude is applied to a machine, causes the machine to break) of an expensive machines such as a universal joint connected to the torque limiter is reduced, the machines are reliably prevented from breaking.

Further, the present inventors investigated the relationship between the cross-sectional shape in a cross section perpendicular to the extending direction of the oil-seal preventing groove, and the release torque. Then, from a multiplicity of experimental results on the cross-sectional shape of a cross section perpendicular to the extending direction of the oil-seal preventing groove and the release torque, the inventors found out that a larger release torque can be obtained independently of the pitch of the spiral-shaped groove and moreover an approximately desired (design value) release torque can be obtained on condition that both ends of the groove are R-shaped (curved-surface shape) with a radius $R_1$ of curvature of 1.8 mm to 2.2 mm, the profile of the groove as a whole is circular-arc shaped with a radius $R_2$ of curvature of 2 mm to 6 mm, the width w of the groove is set to 1 time to 2.6 times larger than the radius $R_2$ of curvature of the profile of the circular-arc shaped groove, and the depth d of the groove is set to 0.5 mm to 1.5 mm. Also, by a multiplicity of experimental examples, the inventors found out that if the roughness Ra of both ends (edges) of the groove is set to 1.4 to 1.8, there occurs no damage (scuffing) at both end portions of the groove and there occurs neither wear nor seizure at portions of the outer circumferential surface of the shaft member or the inner circumferential surface of the cylinder member opposed to those both ends of the groove.

Also, the present inventors found out that if a low-temperature nitriding treatment at treatment temperatures of 400° C. to 420° C. is adopted as a curing treatment and if both the outer circumferential surface of the shaft member and the inner circumferential surface of the cylinder member, which are torque transmission surfaces, are cured to equal level, then both the outer circumferential surface 20 of the shaft member 1 and the inner circumferential surface 21 of the cylinder member 2 can be improved in their durability.

Among those skilled in the art, there has conventionally been no concept that both the outer circumferential surface of the shaft member and the inner circumferential surface of the cylinder member, which are torque transmission surfaces, are cured to equal level. As the reason of this, it is believed that in torque limiters, if one of the outer circumferential surface of the shaft member and the inner circumferential surface of the cylinder member, which are torque transmission surfaces, is set larger in hardness than the other of the outer circumferential surface of the shaft member and the inner circumferential surface of the cylinder member, then scuffing and seizure due to relative rotation of the shaft member against the cylinder member in a high surface pressure state can be suppressed, and meanwhile, if both the outer circumferential surface of the shaft member and the inner circumferential surface of the cylinder member are increased in hardness to equal level, then the outer circumferential surface of the shaft member or the inner circumferential surface of the cylinder member would be subjected to scuffing, seizure and wear due to the relative rotation of the shaft member against the cylinder member in a high surface pressure state.

However, the present inventors have found out that even if one of the outer circumferential surface of the shaft member and the inner circumferential surface of the cylinder member, which are torque transmission surfaces, is larger in hardness than the other of the outer circumferential surface of the shaft member and the inner circumferential surface of the cylinder member, there occurs a problem shown below. Specifically, the inventors have found out that the lower-in-hardness torque transmission surface is more prone to wear, the lower-in-hardness torque transmission surface is lower in durability, and whichever the shaft member or the cylinder member having the lower-in-hardness torque transmission surface is shorter in life. Further, the inventors have found out that if the inner circumferential surface of the cylinder member is higher in strength than the outer circumferential surface of the shaft member, then there are some cases where the inner circumferential surface of the cylinder member has its flexibility lost so that the inner circumferential surface of the cylinder member becomes less easy to contract in diameter during torque transmission, with the transmittable torque reduced. Conversely, the inventors have also found out that if the inner circumferential surface of the cylinder member is lower in strength than the outer circumferential surface of the shaft member, then a portion between the hydraulic passage and the inner circumferential surface of the cylinder member, which is thinner in wall thickness and weaker in strength, is more prone to damage, in which case the cylinder member is shorter in life.

Furthermore, the present inventors have found out that the issue of durability, the issue of the flexibility of the inner circumferential surface of the cylinder member, and the issue of the damage of the portion between the hydraulic passage and the inner circumferential surface of the cylinder member can be solved on condition that a low-temperature nitriding treatment at temperatures of 400° C. to 420° C., which are 100° C. or more lower than the ordinary nitriding treatment temperature of 560° C., is adopted in particular as the curing treatment and both the outer circumferential surface of the shaft member and the inner circumferential surface of the cylinder member, which are torque transmission surfaces, are cured to equal level and to a surface hardness of 600 Hv or higher. Also, the inventors have found out that on condition that both the outer circumferential surface of the shaft member and the inner circumferential surface of the cylinder member are cured to equal level and to a surface hardness of 600 Hv or higher by the low-temperature nitriding treatment at treatment temperatures of 400° C. to 420° C., there occurs no interference of the cylinder member against the shaft member due to strain of the inner circumferential surface of the cured cylinder member, unlike cases using curing methods other than the low-temperature nitriding (e.g., carburization or the like).

According to the torque limiter of the first embodiment, since the outer circumferential surface 20 of the shaft member 1 has the oil-seal preventing groove 35 opened on both sides in the axial direction of the shaft member 1, excess (more than necessary) seizure-preventing lubricating oil present between the shaft member 1 and the first cylinder member 10, during normal torque transmission with no excessive load applied to the shaft member 1 or the first cylinder member 10, can be discharged outside via the opening of the oil-seal preventing groove 35 by the surface pressure which is generated by the oil-pressure expansion oil sealed in the hydraulic passage 26 and with which the inner circumferential surface 21 of the first cylinder member 10 presses the outer circumferential surface 20 of the shaft member 1. Accordingly, the seizure-preventing lubricating oil present between the shaft member 1 and the first cylinder member 10 is never excessively retained or sealed between the outer circumferential surface 20 of the shaft member 1 and the inner circumferential surface 21 of the cylinder member 2 and, as a result, the force with which the first cylinder member 10 clamps the shaft member 1 is never weakened to an extent more than a specified value (design value). Thus, the release torque can be prevented from lowering to much lower than a specified value, so that the release torque can be set generally to a design value.

Also, according to the torque limiter of the first embodiment, since a necessary amount of the seizure-preventing lubricating oil can be made present between the shaft member 1 and the first cylinder member 10, there never occurs seizure in the shaft member 1 and the first cylinder member 10 even when the shaft member 1 is rotated relative to the first cylinder member 10 due to an overload applied to the torque limiter.

Also, according to the torque limiter of the first embodiment, the oil-seal preventing groove 35 is spiral-shaped and therefore easy to machine. Further, even if any excess lubricating oil is present at any portion in the circumferential direction, the excess lubricating oil can be discharged outside smoothly.

Also, according to the torque limiter of the first embodiment, since a line drawn by the outer circumferential surface 20 of the shaft member 1 with the groove 35 formed therein in a cross section perpendicular to the extending direction of the groove 35 is smooth at both end portions of the groove 35, torque transmission can be fulfilled even by traction oil that has entered into portions around both end portions of the groove 35 between the groove 35 and portions of the inner circumferential surface 21 of the cylinder member 2 which are opposed by the groove 35 and which range inward along both ends 54, 55 of the groove 35 during the torque transmission. Accordingly, the release torque can be increased and moreover variations in release torque can be further suppressed.

Also, according to the torque limiter of the first embodiment, since a line drawn by the outer circumferential surface 20 of the shaft member 1 with the groove 35 formed therein in a cross section perpendicular to the extending direction of the groove 35 is smooth at both end portions of the groove 35, there never occurs damage (scuffing) or seizure at both ends 54, 55 of the groove 35 and in portions of the inner circumferential surface 21 of the first cylinder member 10 opposed by the groove 35 even with very high surface pressures (surface pressures of about 50 to 100 MPa) applied to the outer circumferential surface 20 of the shaft member 1 and the inner circumferential surface 21 of the cylinder member 2 during torque transmission.

Also, according to the torque limiter of the first embodiment, since the line drawn by the groove 35 in a cross section perpendicular to the extending direction of the groove 35 is a curved line which is concave toward the depthwise direction of the groove 35 and which is smooth over the entire profile of the groove 35, the groove 35 can be made free from any bend and large in strength unlike common triangular-shaped-in-cross-section grooves which are formed by cutting tools and which are used in various machines, for example. Accordingly, vicinities of the bottom portion of the groove 35 are almost free from damage, so that the torque limiter can be prolonged in service life. Also, while the depth d (see FIG. 2) of the groove 35 is set shallow, a large groove width w (see FIG. 2) of the groove 35 can be ensured in comparison to common triangular-shaped-in-cross-section grooves, the effect of discharging the seizure-preventing lubricating oil (traction oil) outside can be enhanced and, at the same time, the lubricating oil (traction oil) can be diffused without increasing the number of turns of the spiral-shaped groove 35. Thus, the lubricity can be improved.

Also, according to the torque limiter of the first embodiment, since seizure-preventing lubricating oil for contact surfaces applied to between the outer circumferential surface 20 of the shaft member 1 and the inner circumferential surface 21 of the cylinder member 2 is a traction oil, the traction oil is solidified into a vitrified state when the pressure of the contact portions of the outer circumferential surface 20 of the shaft member 1 and the inner circumferential surface 21 of the cylinder member 2 comes to a certain level or higher, thus allowing torque transmission to be more easily achieved. Therefore, the transmittable torque can be increased to a large extent and moreover the release torque can be made further closer to a specified value. Further, since the traction oil has a property of being solidified into a vitrified state by a specified pressure, there can be obtained a larger effect for suppressing wear and seizure of the shaft member 1 and the cylinder member 2 due to direct contact and relative rotation of the shaft member 1 against the cylinder member 2.

Also, according to the torque limiter of the first embodiment, since the value obtained by dividing the pitch of the spiral-shaped oil-seal preventing groove 35 opened at its both ends by the shaft diameter (outer diameter) of the shaft member 1 is not less than $1/10$ and not more than $1/5$, the actual release torque can be set generally to a desired value (design value) and moreover scuffing of the groove can be prevented.

Also, according to the torque limiter of the first embodiment, mutually sliding contact portions of the outer circumferential surface 20 of the shaft member 1 and the inner circumferential surface 21 of the cylinder member 2 (it is noted here that the mutually sliding contact portions of the outer circumferential surface of the shaft member and the inner circumferential surface of the cylinder member correspond to portions except the groove in the regions constituted by the mutually frictionally-coupled outer circumferential surface of the shaft member and inner circumferential surface of the cylinder member. In the first embodiment, since only the outer circumferential surface 20 of the shaft member 1 has the groove 35, the mutually sliding contact portions correspond to portions except the groove 35 in the outer circumferential surface 20 of the shaft member 1 and the inner circumferential surface 21 of the cylinder member 2) have a nitride layer, and since the mutually sliding contact portions of the outer circumferential surface 20 of the shaft member 1 and the inner circumferential surface 21 of the cylinder member 2 have generally equal hardness, the shaft member 1 and the cylinder member 2 can be improved in durability. Besides, since the mutually sliding contact portions of the outer circumferential surface 20 of the shaft member 1 and the inner circumferential surface 21 of the cylinder member 2 include a nitride layer, the mutually sliding contact portions of the outer circumferential surface 20 of the shaft member 1 and the inner circumferential surface 21 of the cylinder member 2 can be increased in hardness. Moreover, since the nitride layer is provided by low-temperature nitriding treatment, the mutually sliding contact portions of the outer circumferential surface 20 of the shaft member 1 and the inner circumferential surface 21 of the cylinder member 2 can be reduced in strain, so that the transmittable torque can be made larger and the release torque can be made closer to a designed release torque.

Also, according to the torque limiter of the first embodiment, since the oil-seal preventing groove 35 include a nitride layer, the torsional strength of the groove 35 can be made larger, making it possible to increase the component of the torque transmitted by the intervention of lubricating oil that has entered between the groove 35 and portions of the inner circumferential surface 21 of the cylinder member 2 which are opposed by the groove 35 and which range inward along edge portions of the groove 35. Accordingly, the transmittable torque can be further increased, and the release torque can be made further closer to the designed release torque.

Also, according to the torque limiter of the first embodiment, since the Vickers hardness of the outer circumferential surface 20 and the inner circumferential surface 21 is not less than 600, and since the thickness of the nitride layer is not less than 2 µm and not more than 3 µm, the shaft member 1 and the cylinder member 2 can be further improved in their durability, so that the life of the torque limiter can be further prolonged.

In the torque limiter of the first embodiment, the oil-seal preventing groove 35 opened on both sides in the axial direction of the shaft member 1 is formed in the outer circumferential surface 20 of the shaft member 1. However, the oil-seal preventing groove opened on both sides in the axial direction of the shaft member may also be formed in the inner circumferential surface of the cylinder member that is to be brought into contact with the outer circumferential surface of the shaft member to fulfill the torque transmission. Besides, the oil-seal preventing groove opened on both sides in the axial direction of the shaft member may be formed both in the outer circumferential surface of the shaft member and in the inner circumferential surface of the cylinder member that is to be brought into contact with the outer circumferential surface of the shaft member to fulfill the torque transmission.

In the torque limiter of the first embodiment, the cylinder member 2 is made up of the first cylinder member 10 having the inner circumferential surface 21 to be brought into contact with the outer circumferential surface 20 of the shaft member 1, and the second cylinder member 11 having the hydraulic passage 26 in which the oil-pressure expansion oil is to be sealed. However, the cylinder member may be an integrated type one having an inner circumferential surface to be brought into contact with the outer circumferential surface of the shaft member, and a hydraulic passage in which the oil-pressure expansion oil is to be sealed.

In the torque limiter of the first embodiment, the profile of the groove 35 has a circular-arc shape in a cross section perpendicular to the extending direction of the groove 35. However, the profile of the groove may also be formed into a shape, such as part of an ellipse, other than circular-arc shape in a cross section perpendicular to the extending direction of the groove. In a cross section perpendicular to the extending direction of the groove, the profile of the groove may be formed into any curved-line shape only if it is a curved line which is concave toward the depthwise direction of the groove and which is smooth over the entire profile of the groove.

In the torque limiter of the first embodiment, the spiral-shaped oil-seal preventing groove 35 opened on both sides in the axial direction of the shaft member 1 is formed in the outer circumferential surface 20 of the shaft member 1. However, a plurality of oil-seal preventing grooves opened on both sides in the axial direction of the shaft member and extending generally along the axial direction of the shaft member and moreover positioned at specified intervals in the circumferential direction may be formed in at least one of the outer circumferential surface of the shaft member and the inner circumferential surface of the cylinder member, which fulfill the torque transmission.

In the torque limiter of the first embodiment, the value obtained by dividing the pitch of the spiral-shaped oil-seal preventing groove 35 opened at its both ends by the shaft diameter (outer diameter) of the shaft member 1 is not less than 1/10 and not more than 1/5. The value obtained by dividing the pitch of the spiral-shaped oil-seal preventing groove 35 opened at its both ends by the shaft diameter (outer diameter) of the shaft member may also be a value larger than 1/5 or smaller than 1/10.

In the torque limiter of the embodiment, the surface of the groove 35 is subjected to nitriding treatment. However, the surface of the oil-seal preventing groove may also be non-nitrided.

Furthermore, the traction oil includes those described before as well as known naphthenic synthetic oils, naphthenic mineral oils, silicone oil, and fluorine oils. Examples of these are substances delimited by < > in the paragraph defined by A< >A shown below, as well as derivatives of the substances delimited by < > in the paragraph defined by A< >A shown below. Also, those examples include one kind or pluralities of mixtures of substances, as well as their derivatives, delimited by < > in the paragraph defined by A< >A shown below:

A<

Bis-(α-methyl benzyl)toluene hydride, bis-(α-methyl benzyl)xylene hydride, bis-(α-methyl benzyl)ethyl benzene hydride, decalin, perhydroanthracene, polycyclohexyls, bicyclohexyl, dicyclohexyl methane, low grade polymers of isobutylene hydrides, adamantanes, 2,4-dicyclohexyl-2-methyl pentane, hydrogenated alkyl naphthalenes, hydrogenated naphthenic mineral oils, hydrogenated polycondensates of alkyl benzenes with formaldehydes, hydrogenated indan dimmers, hydrogenated linear dimmers of α-methyl styrenes, 1-cyclohexyl-1,3,3-trimethyl hydrindane, tricyclopentadiene hydride, bisdecalin, 1,2,3-tricyclohexyl propane, α-methyl styrene trimer, styrene polymer hydride, derivatives from styrene polymer hydrides, monoalkyl benzene, dialkyl benzene, alkyl indan, alkyl tetralin, alkyl indene, alkyl dihydronaphthalene, diphenyl alkane, phenyl indan, phenyl tetralin, phenyl indene, phenyl dihydronaphthalene, alkyl benzenes (propyl benzene, ethyl toluene, trimethyl benzene, butyl benzene, cymene, diethyl benzene, dimethyl ethyl benzene, propyl toluene), benzenes having at least one saturated cyclic sidechain of alkyl (indan, methyl indan, tetralin), aromatic olefin (allyl benzene, methyl styrene, vinyl toluene, ethyl styrene, divinyl benzene, indene, methyl indene), dicyclopentadiene, 2,4-diphenyl-2-methyl pentene hydride, alkyl benzene, dicyclohexyl ethane, dicyclohexyl propane, compounds containing at least one hydrogenated and condensed ring (U.S. Pat. No. 3,411,369), naphthenes having one or more saturated carbo cyclic rings (U.S. Pat. No. 3,440,894), naphthenes having two or more saturated carbo cyclic rings (U.S. Pat. No. 3,925,217), alkyl cyclohexane, alkyl dicyclopentadiene hydride, alkyl naphthalene halide, hydrocarbons having a plurality of cyclohexyl groups in the principal chain (JP 57-172992 A) (dibenzyl toluene, 1,1-(benzyl diphenyl)phenyl ethane, 1,1-(benzyl phenyl)phenyl ethane substituted by at least one monomethyl group, benzyl biphenyl, benzyl monoethyl biphenyl, 1,1-(ethyl biphenyl)phenyl ethane, methyl benzyl biphenyl), cycloaliphatic hydrocarbons, derivatives from crosslinked cyclohexanes, derivatives from crosslinked cycloheptanes (bicyclo[3.2.1]octane, bicyclo[3.1.1]heptane, bicyclo[2.2.1]heptane, tricyclo[5.2.1.02.6]decane, cyclopropane-<1-spiro-2>-norbornane, decahydro-1,4-methano-azulene, 1,5-dimethyl-6-cyclohexanoyloxy-bicyclo[3.2.1]octane, 2,2-dimethyl-3-cyclohexanoyloxy methyl-bicyclo[2.2.1]heptane, 3-hydroxy-2,6,6-trimethyl-bicyclo[3.1.1]heptane, 2,2-dimethyl-3-cyclohexyloxy carbonyl methyl-bicyclo[2.2.1]heptane, 2,2-dimethyl-3-(2-cyano-2-ethoxy carbonyl-ethyl)-bicyclo[2.2.1]heptane, 2,2-dichloro-3,3-dimethyl norbornane, 4,8,8-trimethyl-9-formyl-decahydro-1,4-methano-azulene, 4,8,8-trimethyl-1,4-methano-azulene, 4,8,8-trimethyl-9-cyclohexanoyloxy methyl-decahydro-1,4-methano-azulene, 4,8,8-trimethyl-9-(2-cyano-2-ethoxy carbonyl-ethyl)-decahydro-1,4-methano-azulene, 8- or 9-hydroxy-tricyclo[5.2.1.02.6]-decane, 8- or 9,3,4-trihydroxy-tricyclo-[5.2.1.02.6]-decane, 3- or 4-hydroxy methyl-tricyclo-[5.2.1.02.6]-decane, 3- or 4,8- or 9-dihydroxy methyl-tricyclo-[5.2.1.02.6]-decane), 1-alkyl cyclohexyl ethylene polymer, 1,1-didecalyel ethane, 1,1-didecalyel propane, 1,1-didecalyel butane, 1,1-di (bicyclohexyl)ethane, 1,1-di(bicyclohexyl)propane, 1,1-bisdecalin, 1,2-bisdecalin, 1-decalyl-4-cyclohexyl butane, 1-(2-decalyl)-1-cyclohexyl ethane, 1-(1-decalyl)-1-cyclohexyl ethane, 1-(2-decalyl)-1-(4-(tert-butyl)cyclohexyl) ethane, 1-(1-decalyl)-1-(4-(tert-butyl) cyclohexyl)ethane, 1-dimethyl decalyl-1-cyclohexyl ethane, dicyclohexyl cyclohexyl dicarboxylate ester, dicyclohexyl phthalate ester, 1,2-di-(1-decalyl)propane, 2,3-di-(1-decalyl)butane, 2-(1-decalyl)-3-(2-decalyl)butane, 2,3-di-(2-decalyl)butane, 2-methyl-1,2-di-(1-decalyl)propane, 1-(2-decalyl)-2-(1-decalyl)propane, 1-(1-decalyl)-2-(2-decalyl)propane, 1,2-di(2-decalyl)propane, 2-methyl-1-(2-decalyl)-2-(1-decalyl)propane, 2-methyl-1-(1-decalyl)-2-(2-decalyl)propane, 2-methyl-1,2-di(2-decalyl)propane, 2-methyl-2,3-di-(1-decalyl)butane, 2-methyl-2-(2-decalyl)-3-(1-decalyl)butane, 2-methyl-2-(1-decalyl)-3-(2-decalyl)butane, 2-methyl-di-(2-decalyl)butane, 2-methyl-1,2-di-(cyclohexyl)propane, 2-methyl-2,3-di-(4-methyl cyclohexyl)butane, 2-methyl-1,2-di-(4-ethyl cyclohexyl)propane, 1,1'-bisdecalin, 1,2'-bisdecalin, 1,1-didecalyl ethane, 1,1-didecalyl propane, 1,1-didecalyl butane, 1,1-di-(bicyclohexyl)ethane, 1,1-di-(bicyclohexyl) propane, 2,4,6-tricyclohexyl-2-methyl hexane, 1-cyclohexyl-1-(dicyclohexyl)-ethane, 1-cyclohexyl-1-(2-cyclohexyl ethyl)cyclohexane, 1-cyclohexyl-1-(2,4-dicyclohexyl butyl)cyclohexane, 1-(2-decalyl)-1-cyclohexyl ethane, 1-(1-decalyl)-1-cyclohexyl ethane, 1-(2-decalyl)-1-(4-(tert-butyl) cyclohexyl)ethane, 1-(1-decalyl)-1-(4-(tert-butyl)cyclohexyl)ethane, 1-dimethyl decalyl-1-cyclohexyl ethane, 2,4-dicyclohexyl-2-methyl pentene, 1-cyclohexyl-1-dicyclohexyl methane, 1-cyclohexyl methyl cyclohexyl-1-cyclohexyl ethane, dicyclohexyl cyclohexane, 1-methyl decalyl-1-cyclohexyl ethane, bis-(1-cyclohexyl ethyl) dimethyl cyclohexane, bis-(1-cyclohexyl methyl)-methyl cyclohexane, polyorganosiloxanes having at least one phenyl group or at least one cyclohexyl group, 2,4-dicyclohexyl pentane, 2-cyclohexyl-4-(3-ethyl cyclohexyl)-pentane, 2-cyclohexyl-4-(4-ethyl cyclohexyl)-pentane, 2-cyclohexyl-4-(4-methyl cyclohexyl)-pentane, 2,4-dicyclohexyl hexane, 3,5-dicyclohexyl heptane, 1-(1-tetralyl)-1-phenyl ethane, 1-(2-tetralyl)-1-phenyl ethane, 1-(1-naphthyl)-1-phenyl ethane, 1-(2-naphthyl)-1-phenyl ethane, 2-tetralyl-2-phenyl propane, 1-tetralyl-1-cyclohexyl ethane, 1-naphthyl-1-phenyl methane, 1-methyl naphthyl-1-phenyl ethane, 1-tetralyl-1-(4-tert-butyl)phenyl ethane, 1-(2-decalyl)-1-cyclohexyl ethane, 1-(1-decalyl)-1-cyclohexyl ethane, 1-(2-decalyl)-1-(4-(tert-butyl)cyclohexyl)ethane, 1-(1-decalyl)-1-(4-(tert-butyl)cyclohexyl)ethane, 1-dimethyl decalyl-1-cyclohexyl ethane, 1-methyl decalyl-1-cyclohexyl ethane, 2-decalyl-2-cyclohexyl propane, dodecalyl-1-cyclohexyl methane, 1,1-ditetralyl ethane, 1,2-ditetralyl-2-methyl propane, 1-tetralyl-1-phenyl ethane, 1-naphthyl-1-phenyl ethane, 2-tetralyl-2-phenyl propane, 1-methyl naphthyl-1-phenyl ethane, 1-dimethyl naphthyl-1-phenyl ethane, 1-decalyl-1-cyclohexyl ethane, 1,1-didecalyl ethane, 2-methyl-1,2-didecalyl propane, 1,2'-bisdecalin, 2-decalyl-2-cyclohexyl propane, 1-dimethyl decalyl-1-cyclohexyl ethane, 1-methyl decalyl-1-cyclohexyl ethane, 1,2-ditetralyl propane, 1,1-dinaphthyl ethane, 1,1-binaphthyl, 1-[1-(methyl-cis-decalyl)]-1-cyclohexyl ethane, 1-[2-(methyl-cis-decalyl)]-1-cyclohexyl ethane, 1-(1-cis-decalyl)-1-cyclohexyl ethane, 1-(2-cis-decalyl)-1-cyclohexyl ethane, 2-(1-cis-decalyl)-2-cyclohexyl propane, 2-(2-cis-decalyl)-2-cyclohexyl propane, hydrogenated 1,1-(benzyl phenyl)phenyl ethane, hydrogenated 1,1-((methyl benzyl)phenyl)phenyl ethane, hydrogenated 1,1-(benzyl phenyl)(methyl phenyl)ethane, hydrogenated 1,1-(benzyl methyl phenyl)phenyl ethane, hydrogenated phenethyl benzyl benzene, hydrogenated phenethyl benzyl toluene, 1-cyclohexyl-1,4-dimethyl decalin, 1,3-dicyclohexyl-1-methyl cyclopentane, 1-ethyl-1,3-dicyclohexyl-4-methyl cyclopentane, 1,3-dicyclohexyl-4,4-dimethyl-1-isopropyl cyclopentane, 4-ethyl-1,3-dicyclohexyl-1-n-propyl cyclopentane, cyclohexyl cyclohexanoate, aromatic hydrocarbons substituted by at least one tetracyclo[6.2.1.13.6.02.7]dodeca-4-yl group,
aromatic hydrocarbons substituted by at least one tetracyclo[6.2.1.13.6.02.7]dodeca-5-yl group, condensed ring compounds and crosslinked compounds as described in JP 62-4785 A, copolymers consisting of cyclohexanes and alkenes, copolymers consisting of cyclohexanes and alkenes, aromatic hydrocarbon hydrides substituted by at least one tetracyclo[6.2.1.13.6.02.7]dodeca-4-yl group, aromatic hydrocarbon hydrides substituted by at least one tetracyclo[6.2.1.13.6.02.7]dodeca-5-yl group, 1-(2-decalyl)-1-cyclohexyl ethane, 1-(1-decalyl)-1-cyclohexyl ethane, 1-(2-methyl decalyl)-1-cyclohexyl ethane, 1-(1-methyl decalyl)-1-cyclohexyl ethane, 1-dimethyl decalyl1-cyclohexyl ethane, 2-(1-decalyl)-2-cyclohexyl propane, 1-(2-decalyl-1-(4-tertbutyl)cyclohexyl)ethane, 1-(1-decalyl)-1-(4-(tert-butyl)cyclohexyl ethane, 2-(2-decalyl)-2-cyclohexyl propane, 2-(2-decalyl)-2-cyclohexyl propane, 1-cyclohexyl-1,4-dimethyl decalin, 1,2-dimethyl cyclohexyl)-2-methyl propane, 2,3-dimethyl cyclohexyl)-butane, 1,3-dicyclohexyl-3-methyl butane, 2,4-dicyclohexyl pentane, 2,4-dicyclohexyl-2-methyl pentane, 1,3-dicyclohexyl-1-methyl cyclopentane, 2,2'-bisdecalin, 1,1-di-(1-decalyl)ethane, 1,1-di-(2-decalyl) ethane, 1-(1-decalyl)-1-(2-decalyl)ethane, 1,1-di-(1-decalyl) propane, 1,1-di-(2-decalyl)propane, 1-(1-decalyl)-1-(2-decalyl) propane, 1,1-di-(1-decalyl)butane, 1,1-di-(2-decalyl) butane, 1-(1-decalyl)-1-(2-decalyl)butane, 1,2-di-(1-decalyl)propane, 1,2-di-(2-decalyl)propane, 1-(2-decalyl)-2-(1-decalyl)propane, 1-(1-decalyl)-2-(2-decalyl) propane, 2,3-di-(1-decalyl)butane, 2,3-di-(2-decalyl) butane, 2-(1-decalyl)-3-(2-decalyl)butane, 2-methyl-1,2-di(1-decalyl)propane, 2-methyl-1,2-di(2-decalyl)propane, 2-methyl-1-(1-decalyl)-2-(2-decalyl)propane, 2-methyl-1-(2-decalyl)-2-(1-decalyl)propane, 2-methyl-2,3-di-(1-decalyl)butane, 2-methyl-2,3-di(2-decalyl)butane, 2-methyl-2-(1-decalyl)-3-(2-decalyl)butane, 2-methyl-2-(2-decalyl)-3-(1-decalyl) butane, 1,2-di-(methyl cyclohexyl)-2-methyl propane, 2,3-di-(methyl cyclohexyl)-butane, 1,3-dicyclohexyl-3-methyl butane, 2,4-dicyclohexyl pentane, 2,4-dicyclohexyl-2-methyl pentane, 1,3-dicyclohexyl-1-methyl cyclopentane, aromatic hydrocarbons substituted by at least one tricyclo[5.2.1.02.6]deca-3-yl group, aromatic hydrocarbons substituted by at least one tricyclo[5.2.1.02.6]deca-4-yl group, alkyl diol cyclohexanoate, cyclohexyl alkyl dicarboxylate, 1-cyclohexyl-1-(2-cyclohexyl ethyl)cyclohexane, 1-cyclohexyl-1-(2-cyclohexyl ethyl)methyl cyclohexane, 1-cyclohexyl-1-(2,4-dicyclohexyl butyl)cyclohexane, 1-cyclohexyl-1-(2,4-dicyclohexyl butyl)methyl cyclohexane, 1,3,5-tricyclohexyl-5-methyl hexane, 1,3-di-(methyl cyclohexyl)-5-cyclohexyl-5-methyl hexane, 1,2-di-(methyl cyclohexyl)-2-methyl propane, 2,3-di-(methyl cyclohexyl)-butane, 1,3-dicyclohexyl-3-methyl butane, 2,4-dicyclohexyl pentane, 2,4-dicyclohexyl-2-methyl pentane, 1,3-dicyclohexyl-1-methyl cyclopentane, alkyl benzene hydride, alkylol cyclohexanate, cyclohexyl alkyl carboxilate, naphthenic base oil, (1-(2-decalyl)-1-cyclohexyl ethane, 1-(1-decalyl)-1-cyclohexyl ethane, 1-(2-methyl decalyl)-1-cyclohexyl ethane, 1-(1-methyldecalyl)-1-cyclohexyl ethane, 1-dimethyl decalyl-1-cyclohexyl ethane, 2-(2-decalyl)-2-cyclohexyl propane, 2-(1-decalyl)-2-cyclohexyl propane, 1-cyclohexyl-1,4-dimethyl decalin, 1,2-dimethyl cyclohexyl)-2-methyl propane, 2,3-dimethyl cyclohexyl)-butane, 1,3-dicyclohexyl-3-methyl butane, 2,4-dicyclohexyl pentane, 2,4-dicyclohexyl-2-methyl pentane, 1,3-dicyclohexyl-1-methyl cyclopentane, tercyclohexyl, cyclohexyl methyl decalin, 1-dicyclohexyl-1-cyclohexyl ethane, naphthenic mineral oil, alkyl benzene, alkyl naphthalene, diethyl biphenyl, alkyl biphenyl, phenyl xylyl ethane, benzyl naphthalene, diallyl alkane, bis-(1-methyl-1-cyclohexyl ethyl)methyl decalin, bis-(methyl cyclohexyl methyl) decalin, bis-[1-(methyl cyclohexyl)ethyl]decalin, bis-[1-methyl-1-(methyl cyclohexyl)ethyl]decalin, bis-(methyl cyclohexyl methyl)methyl decalin, bis-[1-(methyl cyclohexyl)ethyl]methyl decalin, bis-[1-methyl-1-(methyl cyclohexyl ethyl)methyl decalin, dicyclohexyl decalin, styrene polymer hydrides as described in JP 62-256890 A, monoesters of cyclohexanoic acids and triols, diesters of cyclohexanoic acid and triol, trimesters of cyclohexanoic acids and triols, 1-(1-tetralyl)-2-phenyl propane, cyclohexyl alkyl cyclohexyl alkylate, 1-decalyl-2-cyclohexyl propane, 1-decalyl-2-cyclohexyl-2-methyl propane, 1-cyclohexyl-2-decalyl propane, 1-cyclohexyl-2-decalyl-2-methyl propane, 1-decalyl-2-cyclohexyl butane, 2-decalyl-3-cyclohexyl butane, 1-cyclohexyl-2-decalyl butane, 1-methyl decalyl-2-cyclohexyl-2-methyl propane, 1-cyclohexyl-2-methyl decalyl-2-methyl propane, 1-decalyl-2-methyl cyclohexyl propane, 1-cyclohexyl-1-(1-decalyl)ethane, 1-cyclohexyl-1-(2-decalyl)ethane, 1,3-dicyclohexyl-3-methyl butane, 2-methyl-2,4-dicyclohexyl pentane, isododecyl cyclohexane, isopentadecyl cyclohexane, 1,2-di-(dimethyl cyclohexyl) propane, 2,3-di-(methyl cyclohexyl)-2-methyl butane, 1,2-di-(methyl cyclohexyl)-2-methyl propane, 2,4-dicyclohexyl pentane, cyclohexyl methyl decalin, 1-(methyl decalyl)-1-cyclohexyl ethane, 1-(dimethyl decalyl)-1-cyclohexyl ethane, 2-decalyl-2-cyclohexyl propane, cyclohexyl methyl perhydrofluorene, 1-perhydrofluorenyl-1-cyclohexyl ethane, cyclohexyl methyl perhydroacenaphthene, 1,1,2-tricyclohexyl ethane, bisdecalin, 1,3,5-tricyclohexyl-5-methyl hexane, 2-(2-decalyl)-2,4,6-trimethyl nonane, 1,1-didecalyl ethane, tercyclohexyl, 1,1,3-trimethyl-3-cyclohexyl hydrindane, 2-methyl-1,2-didecalyl propane, 1-(bicyclo[4.3.0] nonane-7-yl)-1-cyclohexyl ethane, 1-(bicyclo[4.3.0]nonane-8-yl)-1-cyclohexyl ethane, 2-(bicyclo[4.3.0]nonane-7-yl)-2-cyclohexyl propane, 2-(bicyclo[4.3.0]nonane-8-yl)-2-cyclohexyl propane, 2-(bicyclo[4.3.0]nonane-7-yl)-2-cyclohexyl butane, 2-(bicyclo[4.3.0]nonane-8-yl)-2-cyclohexyl butane, 1-(bicyclo[4.3.0]nonane-3-yl)-1-cyclohexyl ethane, 1-(bicyclo[4.3.0]nonane-2-yl)-1-cyclohexyl ethane, 2-(bicyclo[4.3.0]nonane-2-yl)-2-cyclohexyl propane, 2-(bicyclo[4.3.0]nonane-3-yl)-2-cyclohexyl propane, 2-(bicyclo[4.3.0]nonane-2-yl)-2-cyclohexyl butane, 2-(bicyclo[4.3.0]nonane-3-yl)-2-cyclohexyl butane, 2-(bicyclo[4.3.0]nonane-2-yl)-2-cyclohexyl butane, 1-(bicyclo[4.3.0]nonane-8-yl)-1-(4-methyl cyclohexyl)ethane, 1-(bicyclo[4.3.0]nonane-7-yl)-1-(4-methyl cyclohexyl)ethane, 2-(bicyclo[4.3.0]nonane-7-yl)-2-(4-methyl cyclohexyl)propane, 2-(bicyclo[4.3.0]nonane-8-yl)-2-(4-methyl cyclohexyl)propane, 2-(bicyclo[4.3.0]nonane-7-yl)-2-(4-methyl cyclohexyl)butane, 2-(bicyclo[4.3.0]nonane-8-yl)-2-(4-methyl cyclohexyl)butane, 1-(2-methyl bicyclo[4.3.0]nonane-7-yl)-1-cyclohexyl ethane, 1-(3-methyl bicyclo[4.3.0]nonane-7-yl)-1-(4-methyl cyclohexyl)ethane, 1-(bicyclo[4.3.0]nonane-7-yl)-1-(3-methyl cyclohexyl)ethane, 1-(2,3,4-trimethyl bicyclo[4.3.0]nonane-7-yl)-1-(3,4-methyl cyclohexyl)ethane, 1-(9-methyl bicyclo[4.3.0]nonane-7-yl)-1-cyclohexyl ethane, 1-(bicyclo[4.3.0]nonane-7-yl)-1-(4-butyl cyclohexyl)ethane, 1-(3-bicyclo[4.3.0]nonane-3-yl)-1-(4-methyl cyclohexyl)ethane, 1-(bicyclo[4.3.0]nonane-2-yl)-1-(4-methyl cyclohexyl) ethane, 1-(bicyclo[4.3.0]nonane-2-yl)-1-(2-methyl cyclohexyl)ethane, 1-(bicyclo[4.3.0]nonane-3-yl)-1-(2-methyl cyclohexyl)ethane, 1-(bicyclo[4.3.0]nonane-2-yl)-1-(dimethyl cyclohexyl)ethane, 1-(bicyclo[4.3.0]nonane-2-yl)-1-(4-ethyl cyclohexyl)ethane, 2-(bicyclo[4.3.0]nonane-2-yl)-2-cyclohexyl propane, 1,3-di-(cyclohexyl)butyl decalin, 1,3,5-tri-(cyclohexyl)hexyl decalin, 1,3,5,7-tetra-(cyclohexyl)octyl decalin, 1,3-di-(cyclohexyl)butyl monomethyl decalin, 1,3-di-(cyclohexyl)dimethyl decalin, 1,3,5-tri-(cyclohexyl)hexyl monomethyl decalin, 1,3,5-tri-(cyclohexyl) hexyl dimethyl decalin, 1,3,5,7-tetra-(cyclohexyl)octyl monomethyl decalin, 1,3,5,7-tetra-(cyclohexyl)octyl dimethyl decalin, 1,3-di-(methyl cyclohexyl)butyl decalin, 1,3,5-tri-(methyl cyclohexyl)hexyl decalin, 1,3,5,7-tetra-(methyl cyclohexyl)octyl decalin, 1,3-di-(methyl cyclohexyl)butyl monomethyl decalin, 1,3-di-(methyl cyclohexyl)butyl dimethyl decalin, 1,3,5-tri-(methyl cyclohexyl)hexyl monomethyl decalin, 1,3,5-tri-(methyl cyclohexyl)hexyl dimethyl decalin, 1,3,5,7-tetra-(methyl cyclohexyl)octyl monomethyl decalin, 1,3,5,7-tetra-(methyl cyclohexyl)octyl dimethyl decalin, (1,3-dimethyl-1,3-dicyclohexyl)butyl decalin, (1,3, 5-trimethyl-1,3,5-tricyclohexyl)hexyl decalin, (1,3,5,7-tetramethyl-1,3,5,7-tetracyclohexyl)octyl decalin, (1,3-dimethyl-1,3-dicyclohexyl)butyl monomethyl decalin, (1,3-dimethyl-1,3-dicyclohexyl)butyl dimethyl decalin, (1,3,5-trimethyl-1,3,5-tricyclohexyl)hexyl monomethyl decalin, (1,3,5-trimethyl-1,3,5-tricyclohexyl)hexyl dimethyl decalin, (1,3,5,7-tetramethyl-1,3,5,7-tetracyclohexyl) octyl monomethyl decalin, (1,3,5,7-tetramethyl-1,3,5,7-tetracyclohexyl) octyl dimethyl decalin, cis-o-tercyclohexyl compounds, trans-o-tercyclohexyl compounds, derivatives from perhydrofluorene as described in JP 63-132849 A, spiro[perhydrohydrindane-1,1'-hydrindane], spiro[2'-alkyl hydrindane-1,1'-hydrindane], spiro[3'-alkyl hydrindane1,1'-hydrindane], spiro[2',2'-dialkyl hydrindane-1,1'-hydrindane], spiro[3',3'-dialkyl hydrindane-1,1'-hydrindane], spiro[2',2',3'-trialkyl hydrindane-1,1'-hydrindane], spiro[2',3',3'-trialkyl hydrindane-1,1'-hydrindane], spiro[2',2',3',3'-tetraalkyl hydrindane-1,1'-hydrindane], spiro[2'-alkyl hydrindane-1,1'-(2-alkyl hydrindane)], spiro[2'-alkyl hydrindane-1,1'-(2,2-dialkyl hydrindane)], spiro[2'-alkyl hydrindane-1,1'-(2,3-dialkyl hydrindane)], spiro[2'-alkyl hydrindane-1,1'-(3,3-dialkyl hydrindane)], spiro[2'-alkyl hydrindane-1,1'-(2,2,3-trialkyl hydrindane)], spiro[2'-alkyl hydrindane-1,1'-(2,3,3-trialkyl hydrindane)], spiro[3'-alkyl hydrindane-1,1'-(2-alkyl hydrindane)], spiro[3'-alkyl hydrindane-1,1'-(2,2-dialkyl hydrindane)], spiro[3'-alkyl hydrindane-1,1'-(2,3-dialkyl hydrindane)], spiro[3'-alkyl hydrindane-1,1'-(3,3-dialkyl hydrindane)], spiro[2',3'-dialkyl hydrindane-1,1'-(2,2-dialkyl hydrindane)], spiro[2',3'-dialkyl hydrindane-1,1'-(2,3-dialkyl hydrindane)], spiro[2',3'-dialkyl hydrindane-1,1'-(3,3-dialkyl hydrindane)], spiro[2',2',3'-trialkyl hydrindane-1,1'-(2-alkyl hydrindane)], spiro[2',3',3'-trialkyl hydrindane-1,1'-(3-alkyl hydrindane)], spiro[2',2'-dialkyl hydrindane-1,1'-(2,2-dialkyl hydrindane)], spiro[2',2'-dialkyl hydrindane-1,1'-(3,3-dialkyl hydrindane)], spiro[3',3'-dialkyl hydrindane-1,1'-(3',3'-dialkyl hydrindane)], spiro[perhydrohydrindane-1,2'-hydrindane], spiro[1'-alkyl hydrindane-1,2'-hydrindane], spiro[1',1'-dialkyl hydrindane-1,2'-hydrindane], spiro[1',1',3'-trialkyl hydrindane-1,2'-hydrindane], spiro[1',1',3',3'-tetraalkyl hydrindane-1,2'-hydrindane], spiro[1'-alkyl hydrindane-1,2'-(2-alkyl hydrindane)], spiro[1'-alkyl hydrindane-1,2'-(3-alkyl hydrindane)], spiro[1'-alkyl hydrindane-1,2'-(2,2-dialkyl hydrindane)], spiro[1'-alkyl hydrindane-1,2'-(2,3-dialkyl hydrindane)], spiro[1'-alkyl hydrindane-1,2'-(3,3-dialkyl hydrindane)], spiro[1'-alkyl hydrindane-1,2'-(2,2,3-trialkyl hydrindane)], spiro[1'-alkyl hydrindane-1,2'-(2,3,3-trialkyl hydrindane)], spiro[3'-alkyl hydrindane-1,2'-(2-alkyl hydrindane)], spiro[3'-alkyl hydrindane-1,2'-(2,2-dialkyl hydrindane)], spiro[3'-alkyl hydrindane-1,2'-(2,3-dialkyl hydrindane)], spiro[1',3'-dialkyl hydrindane-1,2'-(2-alkyl hydrindane)], spiro[1',3'-dialkyl hydrindane-1,2'-(3-alkyl hydrindane)], spiro[1',3'-dialkyl hydrindane-1,2'-(2,2-dialkyl hydrindane)], spiro[1',3'-dialkyl hydrindane-1,2'-(2,3-dialkyl hydrindane)], spiro[1',3'-dialkyl hydrindane-1,2'-(2,2-dialkyl hydrindane)], spiro[1',3'-dialkyl hydrindane-1,2'-(3,3-dialkyl hydrindane)], spiro[1',1',3'-trialkyl hydrindane-1,2'-(2-alkyl hydrindane)], spiro[1',1',3'-trialkyl hydrindane-1,2'-(3-alkyl hydrindane)], spiro[2'-alkyl hydrindane-1,2'-hydrindane], spiro[3-alkyl hydrindane-1,2'-hydrindane], spiro[2,3-dialkyl hydrindane-1,2'-hydrindane], spiro[2,2-dialkyl hydrindane-1,2'-hydrindane], spiro[3,3-dialkyl hydrindane-1,2'-hydrindane], spiro[2-alkyl hydrindane-1,2'-(1',1'-dialkyl hydrindane)], spiro[3-alkyl hydrindane-1,2'-(1',1'-dialkyl hydrindane)], spiro[2,2,3-trialkyl hydrindane-1,2'-hydrindane], spiro[2,3,3-trialkyl hydrindane-1,2'-hydrindane], spiro[2,2,3,3-tetraalkyl hydrindane-1,2'-hydrindane], spiro[1',1'-dialkyl hydrindane-1,2'-(2,2-dialkyl hydrindane)], spiro[1',1'-dialkyl hydrindane-1,2'-(2,3-dialkyl hydrindane)], spiro[1',1'-dialkyl hydrindane-1,2'-(3,3-dialkyl hydrindane)], spiro[perhydrohydrindane-2,2'-hydrindane], spiro[1-alkyl hydrindane-2,2'-hydrindane], spiro[1,3-dialkyl hydrindane-2,2'-hydrindane], spiro[1,1-dialkyl hydrindane-2,2'-hydrindane], spiro[1'-alkyl hydrindane-2,2'-(1-alkyl hydrindane)], spiro[1'-alkyl hydrindane-2,2'-(1,1-dialkyl hydrindane)], spiro[1'-alkyl hydrindane-2,2'-(1,3-dialkyl hydrindane)], spiro[1'-alkyl hydrindane-2,2'-(1,1,3-trialkyl hydrindane)], spiro[1-alkyl hydrindane-2,2'-hydrindane], spiro[1,3-dialkyl hydrindane-2,2'-hydrindane], spiro[1,1-dialkyl hydrindane-2,2'-hydrindane], spiro[1',3'-dialkyl hydrindane-2,2'-(1,1-dialkyl hydrindane)], 1-(3-perhydroacenaphthyl)-1-cyclohexyl ethane, 1-(4-perhydroacenaphthyl)-1-cyclohexyl ethane, 1-(5-perhydroacenaphthyl)-1-cyclohexyl ethane, 2-(3-perhydroacenaphthyl)-2-cyclohexyl propane, 2-(4-perhydroacenaphthyl)-2-cyclohexyl propane, 2-(5-perhydroacenaphthyl)-2-cyclohexyl propane, 1-(methyl-3-perhydroacenaphthyl)-1-cyclohexyl ethane, 1-(methyl-4-perhydroacenaphthyl)-1-cyclohexyl ethane, 1-(methyl-5-perhydroacenaphthyl)-1-cyclohexyl ethane, 2-(methyl-3-perhydroacenaphthyl)-2-cyclohexyl propane, 2-(methyl-4-perhydroacenaphthyl)-2-cyclohexyl propane, 2-(methyl-5-perhydroacenaphthyl)-2-cyclohexyl propane, 1-(3-perhydroacenaphthyl)-1-(methyl cyclohexyl)ethane, 1-(4-perhydroacenaphthyl)-1-(methyl cyclohexyl)ethane, 1-(5-perhydroacenaphthyl)-1-(methyl cyclohexyl)ethane, 2-(3-perhydroacenaphthyl)-2-(methyl cyclohexyl)propane, 2-(4-perhydroacenaphthyl)-2-(methyl cyclohexyl)propane, 2-(5-perhydroacenaphthyl)-2-(methyl cyclohexyl)propane, 1-(dimethyl-3-perhydroacenaphthyl)-1-cyclohexyl ethane, 1-(dimethyl-4-perhydroacenaphthyl)-1-cyclohexyl ethane, 1-(dimethyl-5-perhydroacenaphthyl)-1-cyclohexyl ethane, 2-(dimethyl-3-perhydroacenaphthyl)-2-cyclohexyl propane, 2-(dimethyl-4-perhydroacenaphthyl)-2-cyclohexyl propane, 2-(dimethyl-5-perhydroacenaphthyl)-2-cyclohexyl propane, 1-(t-butyl-3-perhydroacenaphthyl)-1-cyclohexyl ethane, 1-(t-butyl-4-perhydroacenaphthyl)-1-cyclohexyl ethane, 1-(t-butyl-5-perhydroacenaphthyl)-1-cyclohexyl ethane, 2-(t-butyl-3-perhydroacenaphthyl)-2-cyclohexyl propane, 2-(t-butyl-4-perhydroacenaphthyl)-2-cyclohexyl propane, 2-(t-butyl-5-perhydroacenaphthyl)-2-cyclohexyl propane, 1-(3-perhydroacenaphthyl)-1-(ethyl cyclohexyl)ethane, 1-(4-perhydroacenaphthyl)-1-(ethyl cyclohexyl)ethane, 1-(5-perhydroacenaphthyl)-1-(ethyl cyclohexyl)ethane, 1-(3-perhydroacenaphthyl)-1-(t-butyl cyclohexyl)ethane, 1-(4-perhydroacenaphthyl)-1-(t-butyl cyclohexyl)ethane, 1-(5-perhydroacenaphthyl)-1-(t-butyl cyclohexyl)ethane, 2-(3-perhydroacenaphthyl)-2-(methyl cyclohexyl)propane, 2-(4-perhydroacenaphthyl)-2-(methyl cyclohexyl)propane, 2-(5-perhydroacenaphthyl)-2-(methyl cyclohexyl)propane, 1-(3-perhydroacenaphthyl)-1-(isopropyl cyclohexyl)ethane, 1-(4-perhydroacenaphthyl)-1-(isopropyl cyclohexyl)ethane, 1-(5-perhydroacenaphthyl)-1-(isopropyl cyclohexyl)ethane, 1-(1-perhydroacenaphthyl)-1-cyclohexyl ethane, 2-(1-perhydroacenaphthyl)-2-cyclohexyl propane, 1-(methyl-1-perhydroacenaphthyl)-1-cyclohexyl ethane, 2-(methyl-1-perhydroacenaphthyl)-2-cyclohexyl propane, 1-(1-perhydroacenaphthyl)-1-(methyl cyclohexyl)ethane, 2-(1-perhydroacenaphthyl)-2-(methyl cyclohexyl)propane, 1-(methyl-1-perhydroacenaphthyl)-1-(methyl cyclohexyl)ethane, 2-(methyl-1-perhydroacenaphthyl)-2-(methyl cyclohexyl)propane, 1-(dimethyl-1-perhydroacenaphthyl)-1-(methyl cyclohexyl)ethane, 2-(methyl-1-perhydroacenaphthyl)-2-(methyl cyclohexyl)propane, 1-(dimethyl-1- perhydroacenaphthyl)-1-(methyl cyclohexyl)ethane, 2-(dimethyl-1-perhydroacenaphthyl)-2-(methyl cyclohexyl) propane, (1-perhydrofluorenyl)-cyclohexyl methane, (2-perhydrofluorenyl)-cyclohexyl methane, (3-perhydrofluorenyl)-cyclohexyl methane, (4-perhydrofluorenyl)-cyclohexyl methane, 1-(1-perhydrofluorenyl)-1-cyclohexyl ethane, 1-(2-perhydrofluorenyl)-1-cyclohexyl ethane, 1-(3-perhydrofluorenyl)-1-cyclohexyl ethane, 1-(4-perhydrofluorenyl)-1-cyclohexyl ethane, 2-(1-perhydrofluorenyl)-2-cyclohexyl propane, 2-(2-perhydrofluorenyl)-2-cyclohexylpropane, 2-(3-perhydrofluorenyl)-2-cyclohexyl propane, 2-(4-perhydrofluorenyl)-2-cyclohexyl propane, (methyl-1-perhydrofluorenyl)-cyclohexyl methane, (methyl-2-perhydrofluorenyl)-cyclohexyl methane, (methyl-3-perhydrofluorenyl)-cyclohexyl methane, (methyl-4-perhydrofluorenyl)-cyclohexyl methane, 1-(methyl-1-perhydrofluorenyl)-1-cyclohexyl ethane, 1-(methyl-2-perhydrofluorenyl)-1-cyclohexyl ethane, 1-(methyl-2-perhydrofluorenyl)-1-cyclohexyl ethane, 1-(methyl-3-perhydrofluorenyl)-1-cyclohexyl ethane, 1-(methyl-4-perhydrofluorenyl)-1-cyclohexyl ethane, 2-(methyl-1-perhydrofluorenyl)-2-cyclohexyl propane, 2-(methyl-2-perhydrofluorenyl)-2-cyclohexyl propane, 2-(methyl-3-perhydrofluorenyl)-2-cyclohexyl propane, 2-(methyl-4-perhydrofluorenyl)-2-cyclohexyl propane, (1-perhydrofluorenyl)-(methyl cyclohexyl)methane, (2-perhydrofluorenyl)-(methyl cyclohexyl)methane, 1,3,3,3',3'-pentamethyl-bishydrindanyl methane, 1-methyl-3,3,3',3'-tetraethyl-bishydrindanyl methane, 1,3-dimethyl-3,3',3'-triethyl-bishydrindanyl methane, 1,3'-dimethyl-3,3,3'-triethyl-bishydrindanyl methane, 1,3,3'-trimethyl-3,3'-diethyl-bishydrindanyl methane, 1,3,3,3'-tetramethyl-3'-ethyl-bishydrindanyl methane, 1,3,3',3'-tetramethyl-3-ethyl-bishydrindanyl methane, 1,3,3,3',3'-pentamethyl-bishydrindanyl monomethyl methane, 1-methyl-3,3,3',3'-tetraethyl-bisydrindanyl monomethyl methane, 1,3-dimethyl-3,3',3'-triethyl-bishydrindanyl monomethyl methane, 1,3'-dimethyl-3,3,3'-triethyl-bishydrindanyl monomethyl methane, 1,3,3'-trimethyl-3,3'-diethyl-bishydrindanyl monomethyl methane, 1,3,3,3'-tetramethyl-3'-ethyl-bishydrindanyl monomethyl methane, 1,3,3,3',3'-pentamethyl-bishydrindanyl dimethyl methane, 1,3,3',3'-tetramethyl-3-ethyl-bishydrindanyl dimethyl methane, 1-methyl-3,3,3',3'-tetraethyl-bishydrindanyl dimethyl methane, 1,3-dimethyl-3,3',3'-triethyl-bishydrindanyl dimethyl methane, 1,3'-dimethyl-3,3,3'-triethyl-bishydrindanyl dimethyl methane, 1,3,3'-trimethyl-3,3'-diethyl-bishydrindanyl dimethyl methane, 1,3,3,3'-tetramethyl-3'-ethyl-bishydrindanyl dimethyl methane, 1,3,3',3'-tetramethyl-3-ethyl-bishydrindanyl dimethyl methane, 2-cyclohexyl-1,1,4,4-tetramethyl decalin, 2-cyclohexyl-1,1,4,4-tetraethyl decalin, 2-cyclohexyl-1,1,4,4-tetrapropyl decalin, 2-cyclohexyl-1,1,4,4-tetrabutyl decalin, 2-cyclohexyl-1,1,4-trimethyl-1-ethyl decalin, 2-cyclohexyl-1,1,4-trimethyl-1-propyl decalin, 2-cyclohexyl-1,1,4-triethyl-1-methyl decalin, 2-cyclohexyl-1,1,4-triethyl-1-propyl decalin, 2-cyclohexyl-1,1,4-triethyl-1-butyl decalin, 2-cyclohexyl-1,4-diethyl-1,4-dipropyl decalin, 2-cyclohexyl-1,4-diethyl-1,4-dibutyl decalin, 2-cyclohexyl-1,1-diethyl-4,4-dimethyl decalin, 2-cyclohexyl-1,1-diethyl-4,4-dipropyl decalin, 2-cyclohexyl-1,1-diethyl-4,4-dibutyl decalin, n-butanes substituted by at least one cyclohexyl group, n-butanes substituted by at least one methyl cyclohexyl group, n-butanes substituted by at least one dimethyl cyclohexyl group, n-butanes substituted by at least one ethyl cyclohexyl group, dicyclohexyl alkyl dicarboxylate, hexyl alkyl carboxilate, 1-methyl-1-cyclohexyl ethylene polymers, trimer to hexamer of cyclopentadiene hydrides as described in JP 1-197594 A, cyclopentyloxy silane, cyclohexyloxy silane, cycloheptyloxy silane, bis-(2,3,5-trimethyl cyclohexyl)methane, bis-(3,4,6-trimethyl cyclohexyl)methane, bis-(2,3,6-trimethyl cyclohexyl)methane, 2,3,5-trimethyl cyclohexyl-2',3',6'-trimethyl cyclohexyl methane, 2,3,5-trimethyl cyclohexyl-3',4',6'-trimethyl cyclohexyl methane, 2,3,6-trimethyl cyclohexyl-3',4',6'-trimethyl cyclohexyl methane, 1,1-dicyclohexyl cyclopentane, 1-cyclohexyl-1-(methyl cyclohexyl)-cyclopentane, 1-cyclohexyl-1-(ethyl cyclohexyl)-cyclopentane, 1-cyclohexyl-1-(propyl cyclohexyl)-cyclopentane, 1-cyclohexyl-1-(butyl cyclohexyl)-cyclopentane, 1,1-di-(methyl cyclohexyl)-cyclopentane, 1-(methyl cyclohexyl)-1-(ethyl cyclohexyl)-cyclopentane, 1,1-di-(ethyl cyclohexyl)-cyclopentane, 1,1-dicyclohexyl(methyl cyclopentane), 1-cyclohexyl-1-(methyl cyclohexyl)-(methyl cyclopentane), 1-cyclohexyl-1-(ethyl cyclohexyl)-(methyl cyclopentane), 1-cyclohexyl-1-(methyl cyclohexyl)-(ethyl cyclopentane), 1,1-di-(methyl cyclohexyl)-(methyl cyclopentane), 1,1-dicyclohexyl(methyl ethyl cyclopentane), 1,1-dicyclohexyl cyclohexane, 1-cyclohexyl-1-(methyl cyclohexyl)cyclohexane, 1-cyclohexyl1-(ethyl cyclohexyl)cyclohexane, 1-cyclohexyl-1-(propyl cyclohexyl)cyclohexane, 1-cyclohexyl-1-(butyl cyclohexyl) cyclohexane, 1,1-di-(methyl cyclohexyl)cyclohexane, 1-(methyl cyclohexyl)-1-(ethyl cyclohexyl)cyclohexane, 1,1-di-(ethyl cyclohexyl)cyclohexane, 1,1-dicyclohexyl(methyl cyclohexane), 1-cyclohexyl-1-(methyl cyclohexyl)-(methyl cyclohexane), 1-cyclohexyl-1-(ethyl cyclohexyl)-(methyl cyclohexane), 1-cyclohexyl-1-(methyl cyclohexyl)-(ethyl cyclohexane), 1,1-di-(methyl cyclohexyl)-(methyl cyclohexane), 1,1-dicyclohexyl(dimethyl cyclohexane), 1,1-dicyclohexyl(methyl ethyl cyclohexane), 2,2-dicyclohexyl[2,2,1]bicycloheptane, 2-cyclohexyl-2-(methyl cyclohexyl)-[2,2,1]bicycloheptane, 2,2-di-(methyl cyclohexyl)-[2,2,1]bicycloheptane, 2,2-dicyclohexyl-1,7,7-trimethyl[2,2,1]bicycloheptane, 8,8-dicyclohexyl[4,3,0]bicyclononane, 2,2-dicyclohexyl[2,2,2]bicyclooctane, aralkylated acenaphthene hydrides as described in JP 4-202142 A, 1-(bicyclo[2.2.2]-2-octyl)-1-(trimethyl cyclohexyl)-ethane, 1-(bicyclo[2.2.2]-2-octyl)-1-(trimethyl cyclohexyl)-methane, 1-[3-methyl bicyclo[2.2.2]-2-octyl]-1-(decalyl)-ethane, 1-[3-methyl bicyclo[2.2.2]-2-octyl]-1-(decalyl)-methane; (bicyclo[2.2.2]-2-octyl)-trimethyl cyclohexane, (bicyclo[2.2.2]-2-octyl)-decalin, 1,1-bis-(bicyclo[2.2.2]-2-octyl)-methane, 1,1-bis-(bicyclo[2.2.2]-2-octyl)-ethane; bis-(bicyclo[2.2.2]-2-octyl), 1-(2-methyl bicyclo[2.2.2]-2-octyl)-1-(bicyclo[2.2.2]-2-octyl)-methane, 1-(2-methyl bicyclo[2.2.2]-2-octyl)-1-(bicyclo[2.2.2]-2-octyl)-ethane, 1-(2,3-dimethyl bicyclo[2.2.2]-2-octyl)-1-(3-methyl bicyclo[2.2.2]-2-octyl)-methane, 1-(2,3-dimethyl bicyclo[2.2.2]-2-octyl)-1-(3-methyl bicyclo[2.2.2]-2-octyl)-ethane, 2-(bicyclo[3.2.1]-2-octyl)-bicyclo[3.2.1]octane, 3-(bicyclo[3.2.1]-2-octyl)-bicyclo[3.2.1]octane, bis-(bicyclo[3.2.1]-2-octyl), bis-(bicyclo[3.2.1]-3-octyl), bis-(4-methyl bicyclo[3.2.1]-2-octyl), bis-(4-methyl bicyclo[3.2.1]-3-octyl), 1-(2-methyl bicyclo[3.2.1]-2-octyl)-1-(bicyclo[3.2.1]-2-octyl)-methane, 1-(2-methyl bicyclo[3.2.1]-2-octyl)-1-(bicyclo[3.2.1]-2-octyl)-ethane, 2-(2-methyl bicyclo[3.2.1]-2-octyl)-bicyclo[3.2.1]octane, 3-(2-methyl bicyclo[3.2.1]-2-octyl)-bicyclo[3.2.1]octane, 2-(4-methyl bicyclo[3.2.1]-2-octyl)-bicyclo[3.2.1]octane, 2-(4-methyl bicyclo[3.2.1]-3-octyl)-bicyclo[3.2.1]octane, 3-(4-methyl bicyclo[3.2.1]-2-octyl)-bicyclo[3.2.1]octane, 3-(4-methyl bicyclo[3.2.1]-3-octyl)-bicyclo[3.2.1]octane, 2-(4-methyl bicyclo[3.2.1]-2-octyl)-(2-methyl bicyclo[3.2.1]octane), 2-(4-methyl bicyclo[3.2.1]-3-octyl)-(2-methyl bicyclo[3.2.1]octane), 3-(4-methyl bicyclo[3.2.1]-2-octyl)-(2-methyl bicyclo[3.2.1]octane), 3-(4-methyl bicyclo[3.2.1]-3-octyl)-(2-methyl bicyclo[3.2.1]octane), 2-(bicyclo[3.2.1]-2- octyl)-bicyclo[2.2.1]heptane, 2-(2-methyl bicyclo[3.2.1]-3-octyl)-(2,3-dimethyl bicyclo[2.2.1]heptane), 2-(2-methyl bicyclo[3.2.1]-4-octyl)-(2,3-dimethyl bicyclo[2.2.1]heptane), 2-(2-methyl bicyclo[3.2.1]-3-octyl)-(2-methyl bicyclo[2.2.1]heptane), 2-(2-methyl bicyclo[3.2.1]-4-octyl)-(2-methyl bicyclo[2.2.1]heptane), 2-(2-methyl bicyclo[3.2.1]-3-octyl)-(3-methyl bicyclo[2.2.1]heptane), 2-(2-methyl bicyclo[3.2.1]-4-octyl)-(3-methyl bicyclo[2.2.1]heptane), 1-(2-methyl bicyclo[3.2.1]-3-octyl)-1-(2-methyl bicyclo[2.2.1]-2-heptyl)methane, 1-(2-methyl bicyclo[3.2.1]-4-octyl)-1-(2-methyl bicyclo[2.2.1]-2-heptyl)methane, 1-(2-methyl bicyclo[3.2.1]-3-octyl)-1-(2-methyl bicyclo[2.2.1]-2-heptyl)ethane, 1-(2-methyl bicyclo[3.2.1]-4-octyl)-1-(2-methyl bicyclo[2.2.1]-2-heptyl)ethane, 1-(2-methyl bicyclo[3.2.1]-3-octyl)-1-(2-methyl bicyclo[2.2.1]-3-heptyl)methane, 1-(2-methyl bicyclo[3.2.1]-4-octyl)-1-(2-methyl bicyclo[2.2.1]-3-heptyl)methane, 1-(2-methyl bicyclo[3.2.1]-3-octyl)-1-(2-methyl bicyclo[2.2.1]-3-heptyl)ethane, 1-(2-methyl bicyclo[3.2.1]-4-octyl)-1-(2-methyl bicyclo[2.2.1]-3-heptyl)ethane, 1-(2-methyl bicyclo[3.2.1]-3-octyl)-1-(bicyclo[2.2.1]-2-heptyl)methane, 1-(2-methyl bicyclo[3.2.1]-4-octyl)-1-(bicyclo[2.2.1]-2-heptyl)methane, 1-(2-methyl bicyclo[3.2.1]-3-octyl)-1-(bicyclo[2.2.1]-2-heptyl)ethane, 1-(2-methyl bicyclo[3.2.1]-4-octyl)-1-(bicyclo[2.2.1]-2-heptyl)ethane, 1-(bicyclo[3.2.1]-2-octyl)-1-(bicyclo[2.2.1]-2-heptyl)methane, 1-(bicyclo[3.2.1]-3-octyl)-1-(bicyclo[2.2.1]-2-heptyl)methane, 1-(bicyclo[3.2.1]-2-octyl)-1-(bicyclo[2.2.1]-2-heptyl)ethane, 1-(bicyclo[3.2.1]-3-octyl)-1-(bicyclo[2.2.1]-2-heptyl)ethane, methyl abietinate, ethyl abietinate, butyl abietinate, methyl decahydro-α-naphthoate, ethyl decahydro-α-naphthoate, butyl decahydro-α-naphthoate, methyl decahydro-β-naphthoate, ethyl decahydro-β-naphthoate, butyl decahydro-β-naphthoate, hydrogenated cyclopentadiene oligomers, poly dimethyl siloxane, 2,4-dicyclohexyl-2-methyl pentane, 2,4-dicyclohexyl-2-methyl hexane, 2,4-dicyclohexyl-4-methyl hexane, 3,5-dicyclohexyl-3-methyl heptane, 2,4-dicyclohexyl-2-methyl heptane, 4,6-dicyclohexyl-4-methyl heptane, (1-perhydrofluorenyl)-cyclohexyl methane, (2-perhydrofluorenyl)-cyclohexyl methane, (3-perhydrofluorenyl)-cyclohexyl methane, (4-perhydrofluorenyl)-cyclohexyl methane, 1-(1-perhydrofluorenyl)-1-cyclohexyl ethane, 1-(2-perhydrofluorenyl)-1-cyclohexyl ethane, 1-(3-perhydrofluorenyl)-1-cyclohexyl ethane, 1-(4-perhydrofluorenyl)-1-cyclohexyl ethane, 2-(1-perhydrofluorenyl)-2-cyclohexyl propane, 2-(2-perhydrofluorenyl)-2-cyclohexyl propane, 2-(3-perhydrofluorenyl)-2-cyclohexyl propane, 2-(4-perhydrofluorenyl)-2-cyclohexyl propane, (methyl-1-perhydrofluorenyl)-cyclohexyl methane, (methyl-2-perhydrofluorenyl)-cyclohexyl methane, (methyl-3-perhydrofluorenyl)-cyclohexyl methane, (methyl-4-perhydrofluorenyl)-cyclohexyl methane, 1-(methyl-1-perhydrofluorenyl)-1-cyclohexyl ethane, 1-(methyl-2-perhydrofluorenyl)-1-cyclohexyl ethane, 1-(methyl-3-perhydrofluorenyl)-1-cyclohexyl ethane, 1-(methyl-4-perhydrofluorenyl)-1-cyclohexyl ethane, 2-(methyl-1-perhydrofluorenyl)-2-cyclohexyl propane, 2-(methyl-2-perhydrofluorenyl)-2-cyclohexyl propane, 2-(methyl-3-perhydrofluorenyl)-2-cyclohexyl propane, 2-(methyl-4-perhydrofluorenyl)-2-cyclohexyl propane, 1,2-dicyclohexyl ethane, 1,2-dicyclohexyl propane, 2,3-dicyclohexyl butane, 1,2-dicyclohexyl-2-methyl propane, 2,3-dicyclohexyl-2,3-dimethyl butane, 1,3-dimethyl-1-cyclohexyl-3-(2-cyclohexyl-2-methyl propyl)octahydroindan, 1-cyclohexyl-3-(2-cyclohexyl ethyl)octahydroindan, 1-methyl-1-cyclohexyl-3-(2-cyclohexyl ethyl)octahydroindan, 1,3-dimethyl-1-cyclohexyl-3-(2-cyclohexyl ethyl) octahydroindan, 1,3-dimethyl-1-cyclohexyl-3-(2-cyclohexyl propyl)octahydroindan, 2,4,6-tricyclohexyl-2,4-dimethyl heptane, 2,4,6-tricyclohexyl-2-methyl hexane, 2,4,6-tricyclohexyl-2,4,6-trimethyl heptane, 1,1-di-(cyclohexyl acetate) cyclohexane, 1,1-di(decahydronaphthyl acetate)cyclohexane, 1,1-di-(cyclohexyl methyl acetate)cyclohexane, 1,1-di-(cyclohexyl ethyl acetate)cyclohexane, 1,1-di(cyclohexyl cyclohexyl acetate)cyclohexane, 1,1-di-(cyclohexyloxy cyclohexyl acetate)cyclohexane, 1,1-di-(tetrahydropyrane-2-methyl acetate)cyclohexane, 1-(cyclohexyl acetate)-1-(decahydronaphthyl acetate)cyclohexane, 1-(cyclohexyl acetate)-1-(cyclohexyl methyl acetate)cyclohexane, 1-(cyclohexyl acetate)-1-(cyclohexyl ethyl acetate) cyclohexane, 1-(cyclohexyl acetate)-1-(cyclohexyl cyclohexyl acetate)cyclohexane, 1-(cyclohexyl acetate)-1-(cyclohexyloxy cyclohexyl acetate)cyclohexane, 1-(cyclohexyl acetate)-1-(tetrahydropyrane-2-methyl acetate) cyclohexane, 1-(decahydronaphthyl acetate)-1-(cyclohexyl methyl acetate)cyclohexane, 1-(decahydronaphthyl acetate)-1-(cyclohexyl ethyl acetate)cyclohexane, 1-(decahydronaphthyl acetate)-1-(cyclohexyl cyclohexyl acetate)cyclohexane, 1-(decahydronaphthyl acetate)-1-(cyclohexyloxy cyclohexyl acetate)cyclohexane, 1-(decahydronaphthyl acetate)-1-(tetrahydropyrane-2-methyl acetate)cyclohexane, 1-(cyclohexyl methyl acetate)-1-(cyclohexyl ethyl acetate)cyclohexane, 1-(cyclohexyl methyl acetate)-1-(cyclohexyl cyclohexyl acetate) cyclohexane, 1-(cyclohexyl methyl acetate)-1-(cyclohexyloxy cyclohexyl acetate)cyclohexane, 1-(cyclohexyl methyl acetate)-1-(tetrahydropyrane-2-methyl acetate)cyclohexane, 1-(cyclohexyl ethyl acetate)-1-(cyclohexyl cyclohexyl acetate)cyclohexane, 1-(cyclohexyl ethyl acetate)-1-(cyclohexyloxy cyclohexyl acetate)cyclohexane, 1-(cyclohexyl ethyl acetate)-1-(tetrahydropyrane-2-methyl acetate)cyclohexane, 1-di-(cyclohexyl cyclohexyl acetate)-1-(cyclohexyloxy cyclohexyl acetate)cyclohexane, 1-di-(cyclohexyl cyclohexyl acetate)-1-(tetrahydropyrane-2-methyl acetate)cyclohexane, 1-(cyclohexyl ethyl acetate)-1-(tetrahydropyrane-2-methyl acetate)cyclohexane, 1,2-dicyclohexyl propane, 1,2-dicyclohexyl-2-methyl propane, 2,3-dicyclohexyl butane, 2,3-dicyclohexyl-2-methyl butane, 2,3-dicyclohexyl-2,3-dimethyl butane, 1,3-dicyclohexyl butane, 1,3-dicyclohexyl-3-methyl butane, 2,4-dicyclohexyl pentane, 2,4-dicyclohexyl-2-methyl pentane, 2,4-dicyclohexyl-2,4-dimethyl pentane, 1,3-dicyclohexyl-2-methyl butane, 2,4-dicyclohexyl-2,3-dimethyl butane, 2,4-dicyclohexyl-2,3-dimethyl pentane, 1,2-dicyclohexyl-2-ethyl propane, 2,3-dicyclohexyl-2-ethyl butane, 2,3-dicyclohexyl-2,3-diethyl butane, 1,3-dicyclohexyl-3-ethyl butane, 2,4-dicyclohexyl-2-ethyl pentane, 2,4-dicyclohexyl-2,4-diethyl-pentane, 1,3-dicyclohexyl-2-ethyl butane, 2,4-dicyclohexyl-2,3-diethyl-butane, 2,4-dicyclohexyl-2,3-diethyl pentane, 1,2-dicyclohexyl-2-(n-propyl) propane, 2,3-dicyclohexyl-2-(n-propyl)butane, 2,3-dicyclohexyl-2,3-di-(n-propyl)butane, 1,3-dicyclohexyl-3-(n-propyl)butane, 2,4-dicyclohexyl-2-(n-propyl)pentane, 2,4-dicyclohexyl-2,4-di(n-propyl)pentane, 1,3-dicyclohexyl2-(n-propyl)butane, 2,4-dicyclohexyl-2,3-di-(n-propyl)butane, 2,4-dicyclohexyl-2,3-di-(n-propyl)pentane, 1,2-dicyclohexyl-2-(i-propyl)propane, 2,3-dicyclohexyl-2-(i-propyl)butane, 2,3-dicyclohexyl-2,3-di(i-propyl)butane, 1,3-dicyclohexyl-3-(i-propyl)butane, 2,4-dicyclohexyl-2-(i-propyl)pentane, 2,4-dicyclohexyl-2,4-di-(i-propyl)pentane, 1,3-dicyclohexyl-2-(i-propyl)butane, 2,4-dicyclohexyl-2,3-di-(i-propyl)butane, 2,4-dicyclohexyl-2,3-di-(i-propyl)pentane, 1,2-dicyclohexyl-2-cyclohexyl propane, 2,3-dicyclohexyl-2-cyclohexyl butane, 2,3-dicyclohexyl-2,3-dicyclohexyl butane, 1,3-dicyclohexyl-3-cyclohexyl butane, 2,4-dicyclohexyl-2-cyclohexyl pentane, 2,4-dicyclohexyl-2,4-dicyclohexyl pentane, 1,3-dicyclohexyl-2-cyclohexyl butane, 2,4-dicyclohexyl-2,3-dicyclohexyl butane, 2,4-dicyclohexyl-2,3-dicyclohexyl pentane, cyclohexyl amine, cyclohexanone, 2-methyl-2,4-diphenyl pentane, 2-methyl-4-cyclohexyl-2-phenyl pentane, 2-methyl-2-cyclohexyl-4-phenyl-pentane, 2,4-dimethyl-2,4,6-triphenyl heptane, 2,4-dimethyl2-cyclohexyl-4,6-diphenyl heptane, 2,4-dimethyl-4-cyclohexyl-2,6-diphenyl heptane, 2,4-dimethyl-6-cyclohexyl-2,4-diphenyl heptane, 2,4-dimethyl-4,6-dicyclohexyl-2-phenyl heptane, 2,4-dimethyl-2,6-dicyclohexyl-4-phenyl heptane, 2,4-dimethyl-2,4-dicyclohexyl-6-phenyl heptane, terpene ethers as described in JP 11-310545 A, 1,1-dicyclohexyl methane, dicyclohexyl oxalate, dicyclohexyl carbonate, 1,3,5-tricyclohexyl pentane, exo-2-methyl-exo-3-methyl-endo-2-[(endo-3-methyl bicyclo[2.2.1]hept-exo-2-yl)methyl]bicyclo[2.2.1]heptane, endo-2-methyl-exo-3-methyl-exo-2-[(exo-3-methyl bicyclo[2.2.1]hept-exo-2-yl)methyl]bicyclo[2.2.1]heptane, endo-2-methyl-exo-3-methyl-exo-2-[(endo-3-methyl bicyclo[2.2.1]hept-endo-2-yl)methyl]bicyclo[2.2.1]heptane, norbornene derivatives as described in JP 2000-96072 A, poly organosiloxanes containing at least one phenyl group, poly dimethyl siloxane, bicyclo[2.2.1]hept-2-ene; 2-methylene bicyclo[2.2.1]heptane dimmer hydride, 2-methyl bicyclo[2.2.1]hept-2-ene dimmer hydride, 2-methylene-3-methyl bicyclo[2.2.1]heptane dimmer hydride, 3-methylene-2-methyl bicyclo[2.2.1]heptane dimmer hydride, 2,3-dimethyl bicyclo[2.2.1]hept-2-ene dimmer hydride, 2-methylene-7-methyl bicyclo[2.2.1]heptane dimmer hydride, 3-methylene-7-methyl bicyclo[2.2.1]heptane dimmer hydride, 2,7-dimethyl bicyclo[2.2.1]hept-2-ene dimmer hydride, 2-methylene-5-methyl bicyclo[2.2.1]heptane dimmer hydride, 3-methylene-5-methyl bicyclo[2.2.1]heptane dimmer hydride, 2,5-dimethyl bicyclo[2.2.1]hept-2-ene dimmer hydride, 2-methylene-6-methyl bicyclo[2.2.1]heptane dimmer hydride, 3-methylene-6-methyl bicyclo[2.2.1]heptane dimmer hydride, 2,6-dimethyl bicyclo[2.2.1]hept-2-ene dimmer hydride, 2-methylene-1-methyl bicyclo[2.2.1]heptane dimmer hydride, 3-methylene-1-methyl bicyclo[2.2.1]heptane dimmer hydride, 1,2-dimethyl bicyclo[2.2.1]hept-2-ene dimmer hydride, 2-methylene-4-methyl bicyclo[2.2.1]heptane dimmer hydride, 3-methylene-4-methyl bicyclo[2.2.1]heptane dimmer hydride, 2,4-dimethyl bicyclo[2.2.1]hept-2-ene dimmer hydride, 2-methylene-3,7-dimethyl bicyclo[2.2.1]heptane dimmer hydride, 3-methylene-2,7-dimethyl bicyclo[2.2.1]heptane dimmer hydride, 2,3,7-trimethyl bicyclo[2.2.1]hept-2-ene dimmer hydride, 2-methylene-3,6-dimethyl bicyclo[2.2.1]heptane dimmer hydride, 3-methylene-2,6-dimethyl bicyclo[2.2.1]heptane dimmer hydride, 2-methylene-3,3-dimethyl bicyclo[2.2.1]heptane dimmer hydride, 3-methylene-2,2-dimethyl bicyclo[2.2.1]heptane dimmer hydride, 2,3,6-trimethylbicyclo[2.2.1]hept-2-ene dimmer hydride, 2-methylene-3-ethyl bicyclo[2.2.1]heptane dimmer hydride, 3-methylene-2-ethylbicyclo[2.2.1]heptane dimmer hydride, 2-methyl-3-ethyl bicyclo[2.2.1]hept-2-ene dimmer hydride, cyclohexyl cyclohexane, cyclopentyl cyclohexane, cycloheptyl cyclohexane, cyclopentyl cyclopentane, cyclopentyl cycloheptane, cycloheptyl cycloheptane, compounds containing at least one naphthene ring as described in JP 2001-40381 A, compounds containing at least one naphthene ring as described in JP 2001-55591 A, cyclohexyl methyl siloxane, exo-2-methyl-exo-3-methyl-endo-2-[(endo-3-methyl bicyclo[2.2.1]hept-exo-2-yl)methyl]bicyclo[2.2.1]heptane, exo-2-methyl-exo-3-methyl-endo-2-[(endo-2-methyl bicyclo[2.2.1]hept-exo-3-yl) methyl]bicyclo[2.2.1]heptane, endo-2-methyl-exo-3-methyl-exo-2-[(exo-3-methyl bicyclo[2.2.1]hept-exo-2-yl) methyl]bicyclo[2.2.1]heptane, endo-2-methyl-exo-3-methyl-exo-2-[(exo-2-methyl bicyclo[2.2.1]hept-exo-3-yl) methyl]bicyclo[2.2.1]heptane, endo-2-methyl-exo-3-methyl-exo-2-[(endo-3-methyl bicyclo[2.2.1]hept-endo-2-yl)methyl]bicyclo[2.2.1]heptane, endo-2-methyl-exo-3-methyl-exo-2-[(endo-2-methyl bicyclo[2.2.1]hept-endo-3-yl)methyl]bicyclo[2.2.1]heptane, 2-methylene-3-methyl bicyclo[2.2.1]heptane, 3-methylene-2-methyl bicyclo[2.2.1] heptane, 2,3-dimethyl bicyclo[2.2.1]hept-2-ene, cyclopentadiene trimer, cyclopentadiene trimer hydrides as described in JP 2001-335788 A, organosiloxanes as described in JP 2001-342477 A, cyclohexane polymers, ether compounds as described in JP 2002-128721 A, compounds containing at least one norbornene as described in JP 2002-294265 A, di-(cycloalkyl)alkyl benzene as described in JP 2003-3182 A, compounds containing at least one heterocyclic ring as described in JP 2003-129076 A, ester compounds as described in JP 2004-10502 A, silicone oils as described in JP 2004-210840 A, 6,6-dimethyl-2-[[2,6,6-trimethyl bicyclo[3.1.1]hept-3-yl]methyl]-bicyclo[3.1.1]heptane, 6,6-dimethyl-2-[[2,6,6-trimethyl bicyclo[3.1.1]hept-2-yl]methyl]-bicyclo[3.1.1]heptane, 6,6-dimethyl-2-[[bicyclo[2.2.1]hept-2-yl]methyl]-bicyclo[3.1.1]heptane, 2,2-dimethyl-3-[[3,7,7-trimethyl bicyclo[4.1.0]hept-4-yl]methyl]-bicyclo[2.2.1] heptane, 2,2-dimethyl-3-[[3,7,7-trimethyl bicyclo[4.1.0]hept-3-yl]methyl]-bicyclo[2.2.1]heptane, 2,2-dimethyl-3-[3,7,7-trimethyl bicyclo[4.1.0]hept-4-yl]methyl)-bicyclo[2.2.1]heptane, 2,2-dimethyl-3-[[3,7,7-trimethyl bicyclo[4.1.0]hept-3-yl]methyl]-bicyclo[2.2.1]heptane, 6,6-dimethyl-2-[3,7,7-trimethyl bicyclo[4.1.0]hept-4-yl]methyl)-bicyclo[3.1.1]heptane, 6,6-dimethyl-2-[[3,7,7-trimethyl bicyclo[4.1.0]hept-3-yl]methyl]-bicyclo[3.1.1]heptane, di-[3-methyl bicyclo[2.2.1]hept2-yl]methyl malonate, di[3-methyl bicyclo[2.2.1]hept2-yl]methyl succinate, di-[3-methyl bicyclo[2.2.1]hept2-yl]methyl dimethyl malonate, di-[3-methyl bicyclo[2.2.1]hept-2-yl]methyl diethyl malonate; di-[bicyclo[2.2.1]hept-2-yl]methyl malonate, di-[bicyclo[2.2.1]hept2-yl]methyl succinate, di-[bicyclo[2.2.1]hept-2-yl]methyl dimethyl malonate, di-[bicyclo[2.2.1]hept-2-yl]methyl diethyl malonate, di-[bicyclo[2.2.1]hept2-yl]malonate, di-[bicyclo[2.2.1]hept-2-yl]succinate, di-[bicyclo[2.2.1]hept2-yl]dimethyl malonate, di-[bicyclo[2.2.1]hept-2-yl]diethyl malonate, di1-[bicyclo[2.2.2]octo2-yl]ethyl malonate, di-1-[bicyclo[2.2.2]octo-2-yl]ethyl succinate; di-1-[bicyclo[2.2.2]octo-2-yl]ethyl dimethyl malonate, di-1-[bicyclo[2.2.2]octo-2-yl]ethyl diethyl malonate, di-[bicyclo[2.2.2]octo-2-yl]methyl malonate, di-[bicyclo[2.2.2]octo-2-yl]methyl succinate, di-[bicyclo[2.2.2]octo-2-yl]methyl dimethyl malonate, di-[bicyclo[2.2.2]octo-2-yl] methyl diethyl malonate, decalin, 1,2-hydrindane, perhydrofluoranten, perhydroazonaphthene, cyclohexyl decalin, primary perhydrocyclopentadiene, methylene hydrophenanthrene, dicyclohexyl alkane, polystyrene hydrides, styrene-acrylonitrile copolymer hydrides, styrene-butadiene copolymer hydrides, styrene-butadiene-styrene block copolymer hydrides, styrene-isobutene copolymer hydrides, styrene-butadiene-acrylonitrile copolymer hydrides, styrene-butadiene-methyl methacrylate copolymer hydrides, styrene-indene copolymer hydrides, poly coumarone hydrides, coumarone-indene copolymer hydrides, bis-(1-cyclohexyl ethyl)decalin, bis-(1-methyl-1-cyclohexyl ethyl)decalin, bis-(1-cyclohexyl ethyl)methyl decalin, bis-(1-methyl-1-cyclohexyl ethyl)methyl decalin, tris-(1-cyclohexyl ethyl)decalin, bis-(cyclohexyl methyl)decalin, bis-(cyclohexyl methyl)methyl decalin, tris-(cyclohexyl methyl)decalin, dicyclohexyl decalin, 1-cyclohexyl ethyl(cyclohexyl)decalin, (3-perhydrofluorenyl)-(methyl cyclohexyl)methane, (4-perhydrofluorenyl)-(methyl cyclohexyl)methane, 1-(1-perhydrofluorenyl)-1-(methyl cyclohexyl)ethane, 1-(2-perhydrofluorenyl)-1-(methyl cyclohexyl)ethane, 1-(3-perhydrofluorenyl)-1-(methyl cyclohexyl)ethane, 1-(4-perhydrofluorenyl)-1-(methyl cyclohexyl)ethane, 2-(1-perhydrofluorenyl)-2-(methyl cyclohexyl)propane, 2-(2-perhydrofluorenyl)-2-(methylcyclohexyl)propane, 2-(3-perhydrofluorenyl)-2-(methyl cyclohexyl)propane, 2-(4-perhydrofluorenyl)-2-(methyl cyclohexyl)propane, (methyl-1-perhydrofluorenyl)-(methyl cyclohexyl)methane, (methyl-2-perhydrofluorenyl)-(methyl cyclohexyl)methane, (methyl-3-perhydrofluorenyl)-(methyl cyclohexyl)methane, (methyl-4-perhydrofluorenyl)-(methyl cyclohexyl)methane, 1-(methyl-1-perhydrofluorenyl)-1-(methyl cyclohexyl)ethane, 1-(methyl-2-perhydrofluorenyl)-1-(methyl cyclohexyl)ethane, 1-(methyl-3-perhydrofluorenyl)-1-(methyl cyclohexyl)ethane, 1-(methyl-4-perhydrofluorenyl)-1-(methyl cyclohexyl)ethane, 2-(methyl-1-perhydrofluorenyl)-2-(methyl cyclohexyl)propane, 2-(methyl-2-perhydrofluorenyl)-2-(methyl cyclohexyl)propane, 2-(methyl-3-perhydrofluorenyl)-2-(methyl cyclohexyl)propane, 2-(methyl-4-perhydrofluorenyl)-2-(methyl cyclohexyl)propane, 3-(bicyclo[3.2.1]-2-octyl)-tricyclo[5.2.1.02,6]decane, 4-(bicyclo[3.2.1]-2-octyl)-tricyclo[5.2.1.02,6]decane, 3-(2-methyl bicyclo[3.2.1]-3-octyl)-tricyclo[5.2.1.02,6]decane, 3-(2-methyl bicyclo[3.2.1]-4-octyl)-tricyclo[5.2.1.02,6]decane, 4-(2-methyl bicyclo[3.2.1]-3-octyl)-tricyclo[5.2.1.02,6]decane, 4-(2-methyl bicyclo[3.2.1]-4-octyl)-tricyclo[5.2.1.02,6]decane, 1-(bicyclo[3.2.1]-2-octyl)-1-(tricyclo[5.2.1.02,6]-3-decyl)methane, 1-(bicyclo[3.2.1]-2-octyl)-1-(tricyclo[5.2.1.02,6]-4-decyl)methane, 1-(bicyclo[3.2.1]-3-octyl)-1-(tricyclo[5.2.1.02,6]-3-decyl)methane, 1-(bicyclo[3.2.1]-3-octyl)-1-(tricyclo[5.2.1.02,6]-4-decyl)methane, 1-(bicyclo[3.2.1]-2-octyl)-1-(tricyclo[5.2.1.02,6]-3-decyl)ethane, 1-(bicyclo[3.2.1]-2-octyl)-1-(tricyclo[5.2.1.02,6]-4-decyl)ethane, 1-(bicyclo[3.2.1]-3-octyl)-1-(tricyclo[5.2.1.02,6]-3-decyl)ethane, 1-(bicyclo[3.2.1]-3-octyl)-1-(tricyclo[5.2.1.02,6]-4-decyl)ethane, 2-(bicyclo[3.3.0]-2-octyl)-bicyclo[3.3.0]octane, 3-(bicyclo[3.3.0]-2-octyl)-bicyclo[3.3.0]octane, bis-(bicyclo[3.3.0]-2-octyl); bis-(bicyclo[3.3.0]-3-octyl), bis-(4-methyl bicyclo[3.3.0]-2-octyl), bis-(4-methyl bicyclo[3.3.0]-3-octyl), 1-(2-methyl bicyclo[3.3.0]-2-octyl)-1-(bicyclo[3.3.0]-2-octyl)-methane, 1-(2-methyl bicyclo[3.3.0]-2-octyl)-1-(bicyclo[3.3.0]-2-octyl)-ethane, 2-(2-methyl bicyclo[3.3.0]-2-octyl)-bicyclo[3.3.0]octane, 3-(2-methyl bicyclo[3.3.0]-2-octyl)-bicyclo[3.3.0]octane, 2-(4-methyl bicyclo[3.3.0]-2-octyl)-bicyclo[3.3.0]octane, 2-(4-methyl bicyclo[3.3.0]-3-octyl)-bicyclo[3.3.0]octane, 3-(4-methyl bicyclo[3.3.0]-2-octyl)-bicyclo[3.3.0]octane, 3-(4-methyl bicyclo[3.3.0]-3-octyl)-bicyclo[3.3.0]octane, 2-(4-methyl bicyclo[3.3.0]-2-octyl)-(2-methyl bicyclo[3.3.0]octane), 2-(4-methyl bicyclo[3.3.0]-3-octyl)-(2-methyl bicyclo[3.3.0]octane), 3-(4-methyl bicyclo[3.3.0]-2-octyl)-(2-methyl bicyclo[3.3.0]octane), 3-(4-methyl bicyclo[3.3.0]-3-octyl)-(2-methyl bicyclo[3.3.0]octane), 2-(bicyclo[3.3.0]-2-octyl)-bicyclo[3.2.1]octane, 3-(bicyclo[3.3.0]-2-octyl)-bicyclo[3.2.1]octane, 1-(2-methyl bicyclo[3.3.0]-2-octyl)-1-(bicyclo[3.2.1]-2-octyl)-methane, 1-(2-methyl bicyclo[3.3.0]-2-octyl)-1-(bicyclo[3.2.1]-2-octyl)-ethane, 2-(2-methyl bicyclo[3.3.0]-2-octyl)-bicyclo[3.2.1]octane, 3-(2-methyl bicyclo[3.3.0]-2-octyl)-bicyclo[3.2.1]octane, 2-(4-methyl bicyclo[3.3.0]-2-octyl)-bicyclo[3.2.1]octane, 2-(4-methyl bicyclo[3.3.0]-3-octyl)-bicyclo[3.2.1]octane, 3-(4-methyl bicyclo[3.3.0]-2-octyl)-bicyclo[3.2.1]octane, 3-(4-methyl bicyclo[3.3.0]-3-octyl)-bicyclo[3.2.1]octane, 2-(4-methyl bicyclo[3.3.0]-2-octyl)-(2-methyl bicyclo[3.2.1]octane), 2-(4-methyl bicyclo[3.3.0]-3-octyl)-(2-methyl bicyclo[3.2.1]octane), 3-(4-methyl bicyclo[3.3.0]-2-octyl)-(2-methyl bicyclo[3.2.1]octane), 3-(4-methyl bicyclo[3.3.0]-3-octyl)-(2-methyl bicyclo[3.2.1]octane), (1-perhydrofluorenyl)-(methyl cyclohexyl)methane, (2-perhydrofluorenyl)-(methyl cyclohexyl)methane, (3-perhydrofluorenyl)-(methyl cyclohexyl)methane, (4-perhydrofluorenyl)-(methyl cyclohexyl)methane, 1-(1-perhydrofluorenyl)-1-(methyl cyclohexyl)ethane, 1-(2-perhydrofluorenyl)-1-(methyl cyclohexyl)ethane, 1-(3-perhydrofluorenyl)-1-(methyl cyclohexyl)ethane, 1-(4-perhydrofluorenyl)-1-(methyl cyclohexyl)ethane, 2-(1-perhydrofluorenyl)-2-(methyl cyclohexyl)propane, 2-(2-perhydrofluorenyl)-2-(methyl cyclohexyl)propane, 2-(3-perhydrofluorenyl)-2-(methyl cyclohexyl)propane, 2-(4-perhydrofluorenyl)-2-(methyl cyclohexyl)propane, (methyl-1-perhydrofluorenyl)-(methyl cyclohexyl)methane, (methyl-2-perhydrofluorenyl)-(methyl cyclohexyl)methane, (methyl-3-perhydrofluorenyl)-(methyl cyclohexyl)methane, (methyl-4-perhydrofluorenyl)-(methyl cyclohexyl)methane, 1-(methyl-1-perhydrofluorenyl)-1-(methyl cyclohexyl)ethane, 1-(methyl-2-perhydrofluorenyl)-1-(methyl cyclohexyl)ethane, 1-(methyl-3-perhydrofluorenyl)-1-(methyl cyclohexyl)ethane, 1-(methyl-4-perhydrofluorenyl)-1-(methyl cyclohexyl)ethane, 2-(methyl-1-perhydrofluorenyl)-2-(methyl cyclohexyl)propane, 2-(methyl-2-perhydrofluorenyl)-2-(methyl cyclohexyl)propane, 2-(methyl-3-perhydrofluorenyl)-2-(methyl cyclohexyl) propane, 2-(methyl-4-perhydrofluorenyl)-2-(methyl cyclohexyl)propane, cyclopentadiene as described in JP 1-230696 A, dihydrocyclopentadiene polymer hydrides, (9-perhydrofluorenyl)-cyclohexyl methane, 1-(9-perhydrofluorenyl)-1-cyclohexyl ethane, 2-(9-perhydrofluorenyl)-2-cyclohexyl propane, (methyl-9-perhydrofluorenyl)-cyclohexyl methane, 1-(methyl-9-perhydrofluorenyl)-1-cyclohexyl ethane, 2-(methyl-9-perhydrofluorenyl)-2-cyclohexyl propane, (9-perhydrofluorenyl)-(methyl cyclohexyl)methane, 1-(9-perhydrofluorenyl)-1-(methyl cyclohexyl)ethane, 2-(9-perhydrofluorenyl)-2-(methyl cyclohexyl)propane, (methyl-9-perhydrofluorenyl)-(methyl cyclohexyl)methane, 1-(methyl-9-perhydrofluorenyl)-1-(methyl cyclohexyl)ethane, 2-(methyl-9-perhydrofluorenyl)-2-(methyl cyclohexyl) propane, (dimethyl-9-perhydrofluorenyl)-(methyl cyclohexyl)methane, 1-(dimethyl-9-perhydrofluorenyl)-1-(methyl cyclohexyl)ethane, 2-(dimethyl-9-perhydrofluorenyl)-2-(methyl cyclohexyl)propane, 2-(bicyclo[3.3.0]-2-octyl)-bicyclo[2.2.1]heptane, 2-(2-methyl bicyclo[3.3.0]-3-octyl)-(2,3-dimethyl bicyclo[2.2.1]heptane, 2-(2-methyl bicyclo[3.3.0]-4-octyl)-(2,3-dimethyl bicyclo[2.2.1]heptane), 2-(2-methyl bicyclo[3.3.0]-3-octyl)-(2-methyl bicyclo[2.2.1]heptane), 2-(2-methyl bicyclo[3.3.0]-4-octyl)-(2-methyl bicyclo[2.2.1]heptane), 2-(2-methyl bicyclo[3.3.0]-3-octyl)-(3-methyl bicyclo[2.2.1]heptane), 2-(2-methyl bicyclo[3.3.0]-4-octyl)-(3-methyl bicyclo[2.2.1]heptane), 1-(2-methyl bicyclo[3.3.0]-3-octyl)-1-(2-methyl bicyclo[2.2.1]-2-heptyl)methane, 1-(2-methyl bicyclo[3.3.0]-4-octyl)-1-(2-methyl bicyclo[2.2.1]-2-heptyl)methane, 1-(2-methyl bicyclo[3.3.0]-3-octyl)-1-(2-methyl bicyclo[2.2.1]-2-heptyl)ethane, 1-(2-methyl bicyclo[3.3.0]-4-octyl)-1-(2-methyl bicyclo[2.2.1]-2-heptyl)ethane, 1-(2-methyl bicyclo[3.3.0]-3-octyl)-1-(2-methyl bicyclo[2.2.1]-3-heptyl)methane, 1-(2-methyl bicyclo[3.3.0]-4-octyl)-1-(2-methyl bicyclo[2.2.1]-3-heptyl)methane, 1-(2-methyl bicyclo[3.3.0]-3-octyl)-1-(2-methyl bicyclo[2.2.1]-3-heptyl)ethane, 1-(2-methyl bicyclo[3.3.0]-4-octyl)-1-(2-methyl bicyclo[2.2.1]-3-heptyl)ethane, 1-(2-methyl bicyclo[3.3.0]-3-octyl)-1-(bicyclo[2.2.1]-2-heptyl)methane, 1-(2-methyl bicyclo[3.3.0]-4-octyl)-1-(bicyclo[2.2.1]-2-heptyl) methane, 1-(2-methyl bicyclo[3.3.0]-3-octyl)-1-(bicyclo[2.2.1]-2-heptyl)ethane, 1-(2-methyl bicyclo[3.3.0]-4-octyl)-1-(bicyclo[2.2.1]-2-heptyl)ethane, 1-(bicyclo[3.3.0]-2-octyl)-1-(bicyclo[2.2.1]-2-heptyl)methane, 1-(bicyclo[3.3.0]-3-octyl)-1-(bicyclo[2.2.1]-2-heptyl) methane, 1-(bicyclo[3.3.0]-2-octyl)-1-(bicyclo[2.2.1]-2-heptyl)ethane, 1-(bicyclo[3.3.0]-3-octyl)-1-(bicyclo[2.2.1]-2-heptyl)ethane, (9-perhydrofluorenyl)-cyclohexyl methane, 1-(9-perhydrofluorenyl)-1-cyclohexy ethane, 2-(9-perhydrofluorenyl)-2-cyclohexyl propane, (methyl-9-perhydrofluorenyl)-cyclohexyl methane, 1-(methyl-9-perhydrofluorenyl)-1-cyclohexyl ethane, 2-(methyl-9-perhydrofluorenyl)-2-cyclohexyl propane, (9-perhydrofluorenyl)-(methyl cyclohexyl)methane, 1-(9-perhydrofluorenyl)-1-(methyl cyclohexyl)ethane, 2-(9-perhydrofluorenyl)-2-(methyl cyclohexyl)propane, (methyl-9-perhydrofluorenyl)-(methyl cyclohexyl)methane, 1-(methyl-9-perhydrofluorenyl)-1-(methyl cyclohexyl)ethane, 2-(methyl-9-perhydrofluorenyl)-2-(methyl cyclohexyl) propane, (dimethyl-9-perhydrofluorenyl)-(methyl cyclohexyl)methane, 1-(dimethyl-9-perhydrofluorenyl1-(methyl cyclohexyl)ethane, 2-(dimethyl-9-perhydrofluorenyl)-2-(methyl cyclohexyl) propane, perfluoropolyether represented by formula: F—(CF(CF$_3$)CF$_2$O)$_n$—C$_2$F$_5$
>A Also usable are traction oils formed by mixing those traction oils shown above with known lubricating oils such as paraffinic mineral oils, poly-α-olefinic oils or other hydrocarbon synthetic oils, diesters, polyol esters or other ester oils, polyalkylglycol oil, alkyldiphenylether oil, silicone oil, and perfluoroalkylpolyether oil.

Further, with the aim of further improving the practicality, such additives may be added in proper amounts to the traction oils, as antioxidants, rust-preventive agents, detergent dispersants, pour point depressants, viscosity index improvers, extreme pressure agents, antiwear additives, corrosion inhibitors, antifoaming agents, metal deactivators, and colorants, including additives such as substances delimited by < > in the following paragraph defined by B< >B shown below:
B<

Phosphorus containing organic acid metal amine complexes, poly cyclohexyl acrylate, poly methyl dicyclohexyl acrylate, poly 3,3,5-trimethyl cyclohexyl acrylate, poly cyclohexyl ethyl acrylate, poly bicyclohexyl acrylate, poly cyclohexyl methacrylate, poly methyl cyclohexyl methacrylate, poly 3,3,5-trimethyl cyclohexyl methacrylate, poly cyclohexyl ethyl methacrylate, poly bicyclohexyl methacrylate, alkenyl succinate, cyclic mono-terpenoids as described in JP 1-198692 A, cyclic mono terpenoid dimers as described in JP 1-198693 A, phostaphene derivatives, zinc dithiolate, norbornane dimers, norbornene dimers, particulates, succinate imide, succinate ester, succinate imide, succinate ester, oil-soluble amines having at least one esterized phosphate segment, succinimide, petroleum resins based on cyclopentadiene, hindered phenol compounds, alkylated diphenyl amine compounds, boracic succinate imide compounds, poly methacrylate, alkaline earth metal phenate, alkaline earth metal sulfonate, imide compounds, and zinc alkyl dithiolate, phenyl phosphate, alkyl phenyl phosphate, phenyl thiophosphate, alkyl phenyl thiophosphate, phosphate ester, phosphite ester, cis-decalin, cyclohexane, pyrrolidine, piperidine, morpholine, hydrogenated cyclopentadiene oligomers, poly isobutenyl succinimide organic phosphite, calcium phenate, ethoxylated amine, succinimide, primary amides synthesized with long-chain carboxylic acids, thiophosphate ester, thiophosphite ester, zinc dithiolate, thiadiazole derivatives, dithiocarbamate, thiadiazole derivatives, dithiocarbamate, polyalkylene (thio)ether, poly alkylene thioether, compounds containing at least one sulpha-type heterocyclic ring as described in JP 2002-327189 A, compounds containing at least one pentadecane-type heterocyclic ring as described in JP 2002-327189 A
>B Out of the traction oils listed above, those having larger pressure viscosity indices are preferred. For the use in this case, the traction oil has a pressure viscosity index of preferably 18 GPa$^{-1}$ (40° C.) or more, more preferably 25 GPa$^{-1}$ (40° C.) or more, even more preferably 32 GPa$^{-1}$ (40° C.) or more. Such traction oils are easily vitrifiable by the contact pressure between shaft and sleeve, highly transmittable for driving force, reduced in direct contact between shaft and sleeve to prevent locking of the shaft and the sleeve, and can easily fulfill torque release when the traction oil is liquefied with oil pressure in the hydraulic chamber lowered.

Figure 6:
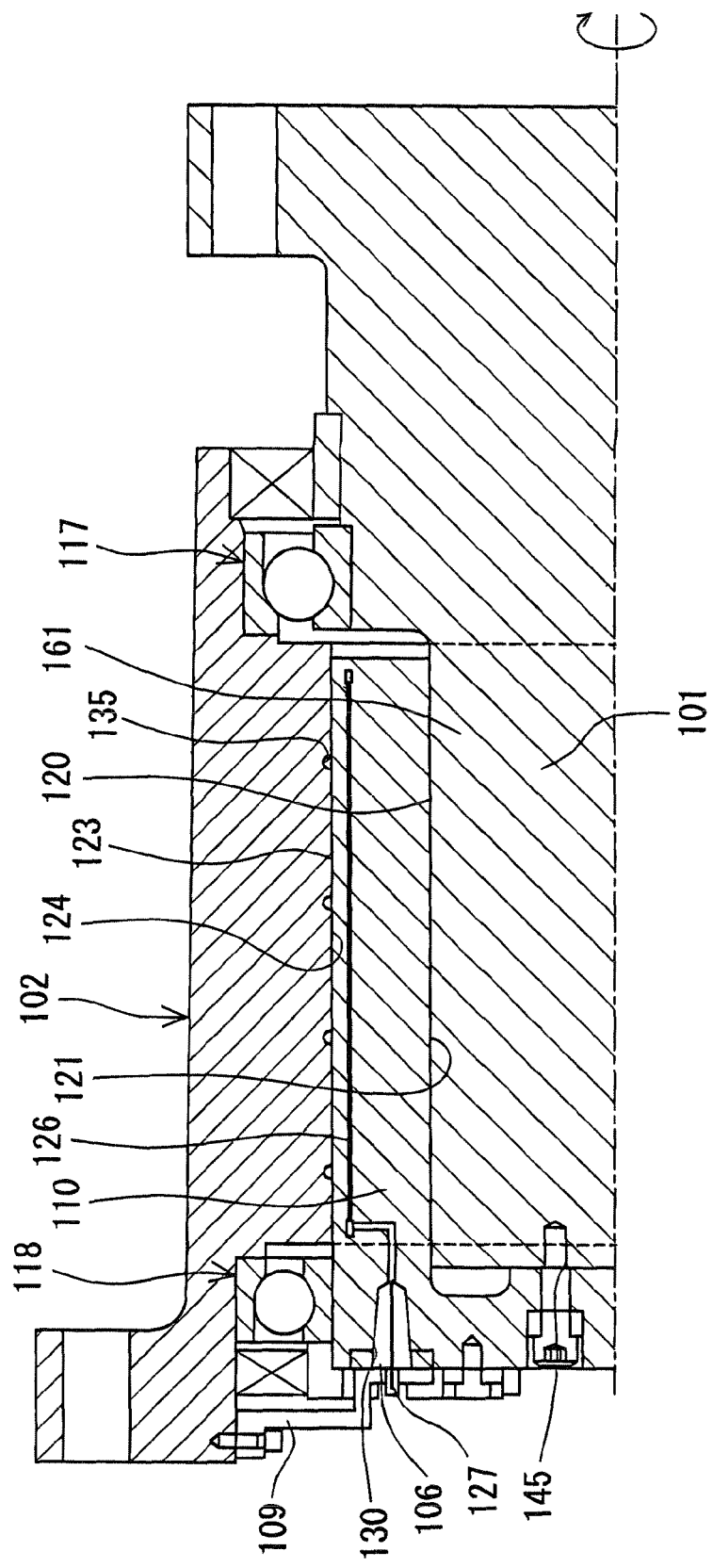
FIG. 6 is an axial sectional view of a torque limiter according to a second embodiment.
Figure 7:
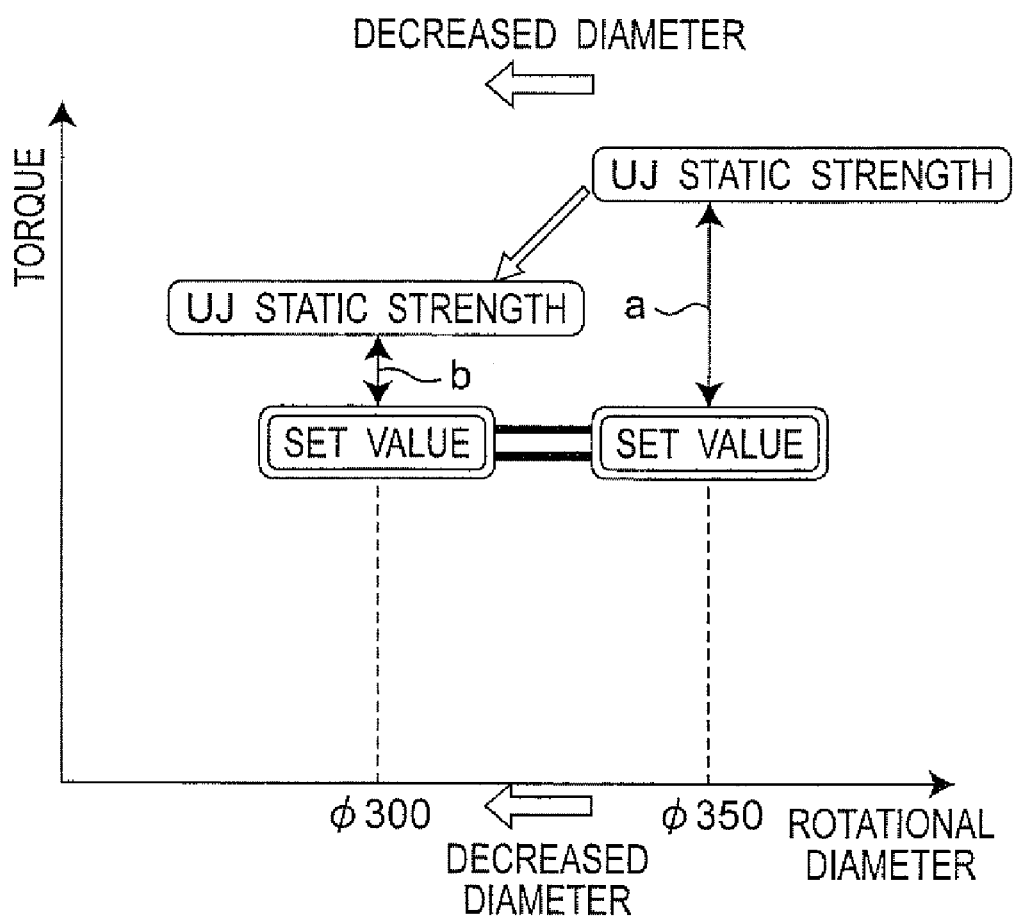
FIG. 7 is a chart for explaining a problem occurring due to a decrease in the static strength of an UJ.

FIG. 6 is an axial sectional view of a torque limiter according to a second embodiment.

The torque limiter of the second embodiment differs from the torque limiter of the first embodiment in that an annular hydraulic passage 126 is formed in a shaft member 101, where the hydraulic passage 126, when radially expanding, causes an outer circumferential surface 123 of the shaft member 101 to be frictionally fitted to an inner circumferential surface 124 of a cylinder member 102. The torque limiter also differs from that of the first embodiment in that an oil-seal preventing groove opened on axial both sides is formed in the cylinder member 102. As to the torque limiter of the second embodiment, its construction, functional effects and modification examples in common to the torque limiter of the first embodiment are omitted in description.

The torque limiter of the second embodiment has the shaft member 101, the cylinder member 102, a shear valve 106, a ball bearing 117 and a ball bearing 118.

The shaft member 101 has a shaft body 161 having a generally cylindrical-shaped outer circumferential surface 120, and an annular member 110. An inner circumferential surface 121 of the annular member 110 is fitted to the outer circumferential surface 120 of the shaft body 161, and the annular member 110 is fixed to the shaft body 161 by a bolt 145. The annular member 110 has a generally cylindrical-shaped outer circumferential surface 123 as its circumferential surface.

The cylinder member 102 has an engagement portion 109 protruding from the inner surface of the cylinder member 102, as well as an inner circumferential surface 124 as its circumferential surface. The inner circumferential surface 124 of the cylinder member 102 has a spiral-shaped oil-seal preventing groove 135 similar to that of the first embodiment. This spiral-shaped groove 135 is opened on axial both sides of a functional engagement portion of the shaft member 101 with the cylinder member 102. Also, the pitch of the spiral-shaped groove 135 is not less than 1/10 and not more than 1/5 of the shaft diameter (outer diameter) of the shaft member 101.

The generally cylindrical-shaped inner circumferential surface 124 of the cylinder member 102 is to be frictionally coupled to the outer circumferential surface 123 of the shaft member 101 (specifically, annular member 110) during torque transmission. A traction oil or its mixture, which is a lubricating oil for use of seizure prevention similar to that of the first embodiment, is applied to between the outer circumferential surface 123 of the shaft member 101 and the inner circumferential surface 124 of the cylinder member 102.

The annular member 110 has a shear valve mounting hole 130, and a hydraulic passage 126 extending generally along the axial direction of the shaft member 101 over an axial specified length of the outer circumferential surface 123 of the annular member 110.

The shear valve 106 is fitted into the shear valve mounting hole 130. In the state that the shear valve 106 is fitted into the shear valve mounting hole 130, one end portion of the shear valve 106 projects axially outward more than the end face of the annular member 110. The engagement portion 109 extends radially along the end face of the annular member 110. The one end portion of the shear valve 106 is engaged with the engagement portion 109.

The shear valve 106 has a tube 127 opened only at one end thereof. The tube 127 extends generally along the axial direction of the shaft member 101 in the state that the shear valve 106 is fitted into the shear valve mounting hole 130. In the state that the shear valve 106 is fitted into the shear valve mounting hole 130, one end portion of the tube 127 on its closed side projects axially outward more than the end face of the annular member 110. An opening of the tube 127 on its one side opposite to the closed side communicates with one end of the hydraulic passage 126. As a result of this, a space on one side of the hydraulic passage 126 on which the shear valve 106 is provided is a sealed space.

In the torque limiter of the second embodiment, a top layer portion of the outer circumferential surface (including the surface of the groove 135) 123 of the annular member 110, which is a torque transmission surface), and a top layer portion of the inner circumferential surface 124 of the cylinder member 102, have been subjected to low-temperature nitriding treatment similar to that of the torque limiter of the first embodiment. The top layer portion of the outer circumferential surface (including the surface of the groove 135) 123 of the annular member 110, and the top layer portion of the inner circumferential surface 124 of the cylinder member 102, has been formed into a nitride layer. Layer thicknesses and hardness of the nitride layer of the torque limiter of the second embodiment are the same as those of the nitride layers of the torque limiter of the first embodiment. The nitride layer of the torque limiter of the second embodiment is so designed as to produce the same functional effects as those of the nitride layers of the torque limiter of the first embodiment.

The ball bearing 117 has an inner ring externally fitted and fixed to the outer surface of the shaft body 161, an outer ring internally fitted and fixed to the inner surface of the cylinder member 102, and balls 46 placed between the raceway surface of the inner ring and the raceway surface of the outer ring. Also, the ball bearing 118 has an inner ring externally fitted and fixed to the outer surface of the annular member 110, an outer ring internally fitted and fixed to the inner surface of the cylinder member 102, and balls placed between the raceway surface of the inner ring and the raceway surface of the outer ring. The ball bearings 117 and 118 support the shaft member 101 so as to allow the shaft member 101 to rotate relative to the cylinder member 102 while the shaft member 101 is rotating relative to the cylinder member 102.

With this construction, in a case where the shaft member 101 and the cylinder member 102 are burdened with a load of a specified value or lower (a load within a range over which torque transmission is fulfilled), the outer circumferential surface 123 of the annular member 110 is enlarged in diameter by the oil-pressure expansion use oil injected into the hydraulic passage 126 via an unshown coupler and thereafter sealed so that the outer circumferential surface 123 is pressed against the inner circumferential surface 124 of the cylinder member 102, by which the shaft member 101 and the cylinder member 102 are frictionally coupled to each other, allowing torque transmission to be fulfilled between the shaft member 101 and the cylinder member 102.

Meanwhile, in another case where the shaft member 101 or the cylinder member 102 is burdened with a load of a specified value or higher (a load beyond the range over which torque transmission is fulfilled) so that the outer circumferential surface 123 of the shaft member 101 slips against the inner circumferential surface 124 of the cylinder member 102 with the shaft member 101 and the cylinder member 102 changed in position about the axis, the engagement portion 109 cuts off one end portion of the shear valve 106, breaking one end portion of the tube 127 on its closed side, so that the oil-pressure expansion use oil within the hydraulic passage 126 is discharged outside from the broken tube 127 side.

In this way, the force with which the outer circumferential surface 123 of the annular member 110 presses the inner circumferential surface 124 of the cylinder member 102 is eliminated, by which the frictional coupling between the shaft member 101 and the cylinder member 102 is released to cut off the torque transmission. Thus, upon occurrence of an overload on the shaft member 101 or the cylinder member 102, torque transmission is cut off so that expensive machines coupled to the torque limiter device are protected or personal injuries are prevented.

The first and second embodiments being thus described, it will be obvious that the same may be varied in many ways. Such variations are not to be regarded as a departure from the spirit and scope of the technology, and all such modifications as would be obvious to one skilled in the art are intended to be included within the scope of the following claims.

The invention claimed is:

1. A torque limiter comprising:
    a shaft member; and
    a cylinder member rotatably externally fitted to the shaft member, wherein
    one member of the cylinder member and the shaft member has, in its inside, a hydraulic passage for pressing a circumferential surface of the one member against a circumferential surface of the other member of the cylinder member and the shaft member when hydraulic pressure is maintained in the hydraulic passage so that torque can be transferred between the cylinder member and the shaft member, and wherein when no hydraulic pressure is maintained in the hydraulic passage, the circumferential surfaces of the cylinder member and the shaft member are not pressed together,
    at least one circumferential surface out of the circumferential surface of the cylinder member and the circumferential surface of the shaft member has an oil-seal preventing groove opened on axial both sides of the shaft member, and wherein in a cross section perpendicular to an extending direction of the oil-seal preventing groove, a line drawn by at least one of the circumferential surface of the cylinder member and the circumferential surface of the shaft member on which the oil-seal preventing groove is formed is smooth at least at both end portions of the oil-seal preventing groove, and
    a traction oil is interposed between the circumferential surface of the cylinder member and the circumferential surface of the shaft member.

2. The torque limiter as claimed in claim 1, wherein the oil-seal preventing groove is spiral-shaped.

3. The torque limiter of claim 2, wherein a pitch of the spiral-shaped oil-seal preventing groove is between $\frac{1}{5}$ and $\frac{1}{10}$ of the diameter of the shaft member.

4. The torque limiter as claimed in claim 1, wherein in the cross section, the line drawn by the at least one of the circumferential surface of the cylinder member and the circumferential surface of the shaft member on which the oil-seal preventing groove is formed is a curved line which is smooth over an entire profile of the oil-seal preventing groove.

5. The torque limiter of claim 4, wherein the oil-seal preventing groove has a symmetrical cross-sectional shape.

6. The torque limiter as claimed in claim 1, wherein mutually sliding contact portions of the circumferential surface of the cylinder member and the circumferential surface of the shaft member respectively have a nitride layer and substantially equal hardness.

7. The torque limiter as claimed in claim 6, wherein the circumferential surface of the cylinder member and the circumferential surface of the shaft member have a Vickers hardness of 600 or higher, and the nitride layers have a layer thickness of 2 µm to 3 µm.

8. The torque limiter of claim 6, wherein the circumferential surface of the cylinder member and the circumferential surface of the shaft member have a nitride layer formed by a low temperature nitriding treatment performed at a temperature of between 400° and 420° C.

9. The torque limiter as claimed in claim 1, wherein the nitride layer is present on a surface of the oil-seal preventing groove, and the circumferential surface of the cylinder member and the circumferential surface of the shaft member have substantially equal hardness.

10. The torque limiter of claim 1, wherein the oil-seal preventing groove has a symmetrical cross-sectional shape.

11. The torque limiter of claim 1, wherein the circumferential surface of the cylinder member and the circumferential surface of the shaft member have a nitride layer formed by a low temperature nitriding treatment performed at a temperature of between 400° and 420° C.

12. The torque limiter of claim 1, wherein the traction oil has a viscosity pressure index of 18-32 $GPa^{-1}$.

13. The torque limiter of claim 1, further comprising a shear valve mounted on an outlet of the hydraulic passage, wherein the shear valve operates to maintain a hydraulic pressure in the hydraulic passage.

14. The torque limiter of claim 13, wherein when the shaft member first begins to rotate with respect to the cylinder member, a shearing member on one of the shaft member and the cylinder member shears off at least a portion of the shear valve to release any hydraulic pressure that was previously maintained in the hydraulic passage.

15. The torque limiter of claim 14, wherein the shear valve is located on one of the shaft member and the cylinder member, and wherein the shearing member is located on the other of the shaft member and the cylinder member.

* * * * *